(12) United States Patent
Roos

(10) Patent No.: US 9,716,547 B2
(45) Date of Patent: *Jul. 25, 2017

(54) METHOD AND APPARATUS FOR BEAM SELECTION FOR A MULTIBEAM, MULTI-SATELLITE COMMUNICATIONS SYSTEM

(71) Applicant: Hughes Network Systems, LLC, Germantown, MD (US)

(72) Inventor: David Alan Roos, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 203 days.

This patent is subject to a terminal disclaimer.

(21) Appl. No.: 14/599,235

(22) Filed: Jan. 16, 2015

(65) Prior Publication Data

US 2015/0229385 A1 Aug. 13, 2015

Related U.S. Application Data

(63) Continuation-in-part of application No. 13/284,117, filed on Oct. 28, 2011, now Pat. No. 9,083,430.

(51) Int. Cl.
*H04B 7/204* (2006.01)
*H04B 7/185* (2006.01)

(52) U.S. Cl.
CPC ....... *H04B 7/2041* (2013.01); *H04B 7/18528* (2013.01)

(58) Field of Classification Search
CPC ..................... H04B 7/2041; H04B 7/18528
See application file for complete search history.

(56) References Cited

U.S. PATENT DOCUMENTS

| 2006/0038083 A1* | 2/2006 | Criswell | B64G 1/428 244/172.7 |
| 2007/0010246 A1* | 1/2007 | Churan | H04B 7/18563 455/427 |

(Continued)

FOREIGN PATENT DOCUMENTS

| WO | 2005/091528 | 9/2005 |
| WO | 2005/122328 | 12/2005 |

OTHER PUBLICATIONS

International Search Report and the Written Opinion for International App No. PCT/US2016/013478, mailed Jun. 30, 2016, Authorized Officer: Bettiol, Brigitte.

*Primary Examiner* — Ajay Cattungal
(74) *Attorney, Agent, or Firm* — Sheppard Mullin Richter & Hamp; Daniel Yannuzzi; Jonathan Marina

(57) ABSTRACT

An apparatus for satellite selection within a multi-satellite communication system, comprising an antenna, receiver, and transmitter, and a processing module configured to calculate a normalized distance metric for the plurality of user spot beams of a first and second satellite, select the user spot beam with the lowest normalized distance metric, and determine which of the at least first or second satellite is transmitting the selected user spot beam. Further, a method for increasing the aggregate capacity of a satellite communications network, comprising identifying high traffic regions within a coverage area of a first satellite, determining which user spot beams of the first satellite are available to each of the identified regions, determining a normalized distance metric for each user spot beam identified, and plotting a second beam pattern of a second satellite to produce at least one user spot beam with a lower normalized distance metric.

34 Claims, 16 Drawing Sheets

(56) References Cited

U.S. PATENT DOCUMENTS

| | | | | |
|---|---|---|---|---|
| 2010/0309050 A1* | 12/2010 | Raguenet | ................ | H01Q 1/28 342/368 |
| 2011/0122245 A1* | 5/2011 | Sinha | ................... | G08B 17/005 348/143 |
| 2011/0222589 A1* | 9/2011 | Howell | .............. | H04B 7/18519 375/213 |
| 2012/0153744 A1* | 6/2012 | Criswell | ................ | B64G 1/428 307/104 |
| 2013/0109376 A1 | 5/2013 | Roos et al. | | |
| 2013/0303080 A1* | 11/2013 | Moreno | ................ | H04J 11/004 455/9 |

* cited by examiner

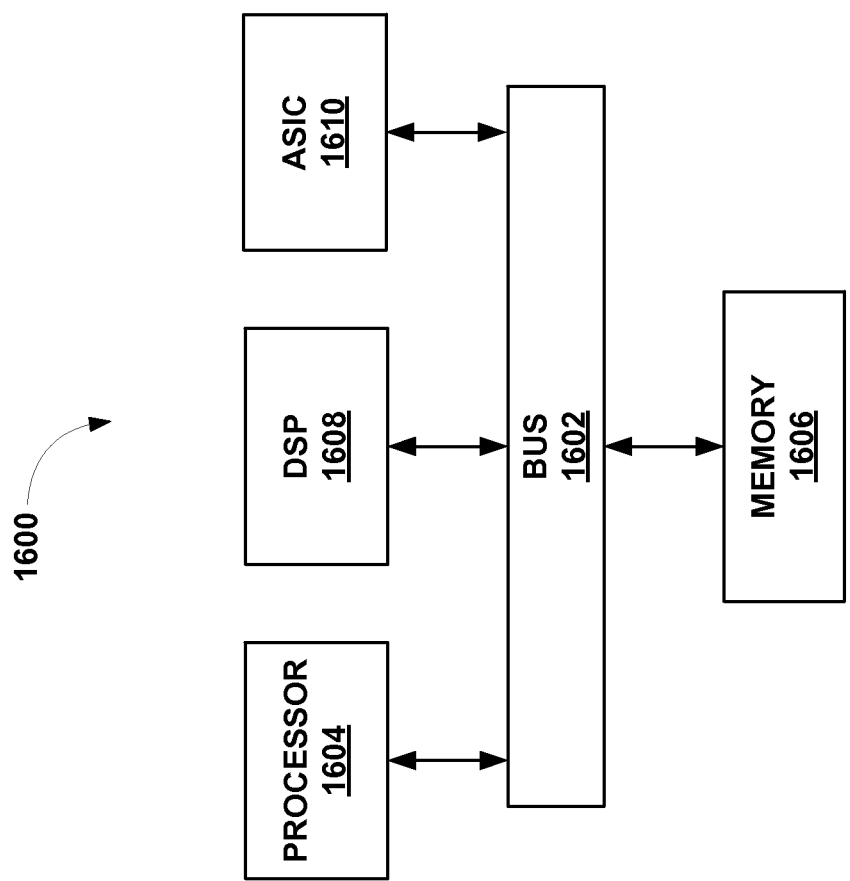

METHOD AND APPARATUS FOR BEAM SELECTION FOR A MULTIBEAM, MULTI-SATELLITE COMMUNICATIONS SYSTEM

CROSS-REFERENCE TO RELATED APPLICATIONS

This application is a continuation-in-part of, and claims the benefit of, U.S. patent application Ser. No. 13/284,117, filed Oct. 28, 2011, which issued as U.S. Pat. No. 9,083,430 on Jul. 14, 2015, which is incorporated herein by reference in its entirety.

BACKGROUND

In a multibeam satellite communications system, each Very Small Aperture Terminal (VSAT) may need to be told, or may otherwise determine, which of several available satellite spot beams the VSAT should use to establish connectivity to the satellite communications system. VSATs may be assigned to their respective spot beams based on their geographic position. For example, if a VSAT's location, when plotted on a map, lies within a particular contour of a spot beam, the VSAT may be assigned to that spot beam. In mobile satellite systems such as the THURAYA system, spot beam selection has been based on a VSAT's measurement of signal strength or signal to noise ratio (SNR) in multiple spot beams, as the VSAT attempts to find the "best" spot beam. The process a VSAT uses to find a spot beam might not be automated, and may be complex.

In addition, the increasing demand for broadband satellite connectivity has made it difficult to provide effective satellite communication to a larger number of users in a given area. That is, the increased demand has resulted in a need for a number of different satellites serving the same or similar geographic region. However, these satellites are usually designed simply based on the effective isotropic radiated power (EIRP), the antenna gain-to-noise temperature ratio (G/T), and the carrier-to-interference ratio (C/I) of the satellite at any particular geodetic location, without concern for how assigning users to one of a plurality of satellites may affect the overall capacity and loading of the system.

BRIEF SUMMARY

Various embodiments of the systems and methods disclosed herein may be configured to provide beam selection for a multibeam, multi-satellite communications system.

In accordance with various embodiments of the technology disclosed herein, an apparatus for beam selection for a multibeam satellite communications system includes a VSAT with a remote satellite dish for sending and receiving RF signals and processor for calculating a normalized distance metric for user spot beams, selecting the user spot beam with the lowest normalized distance metric, and finding an outroute on the selected user spot beam using the remote satellite dish.

In accordance with various embodiments of the technology disclosed herein, an apparatus for satellite selection in a multi-satellite communications system includes a user terminal with an antenna for sending and receiving RF signals and a processor for determining the user spot beams available to service the terminal from the multiple satellites, calculate a normalized distance metric for each user spot beam identified, select the user spot beam with the lowest normalized distance metric, determine which of the multiple satellites the selected spot beam belongs to, and finding an outroute on the selected satellite using the antenna.

In accordance with various embodiments of the technology disclosed herein, a method of increasing the aggregate capacity within a satellite communications network includes determining the coverage area of a first beam pattern of a first satellite; identifying a number of high traffic regions within the coverage area of the first beam pattern; determining which user spot beams of the first beam pattern cover the identified high traffic regions; determining the normalized distance metrics for the identified user spot beams for each high traffic region; and designing a second beam pattern of a second satellite such that at least one center of a user spot beam of the second beam pattern have a lower normalized distance metric relative to the high traffic regions than the user spot beams of the first beam pattern.

Additional advantages and novel features of various embodiments of the technology disclosed herein are set forth in part in the description that follows, and in part will become apparent to those skilled in the art upon examination of the following or may be learned by practice of the technology. Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF SUMMARY OF THE DRAWINGS

FIG. 16 illustrates an example chip set that can be utilized in implementing architectures and methods for dynamic bandwidth allocation in accordance with various embodiments.

Figure 1:
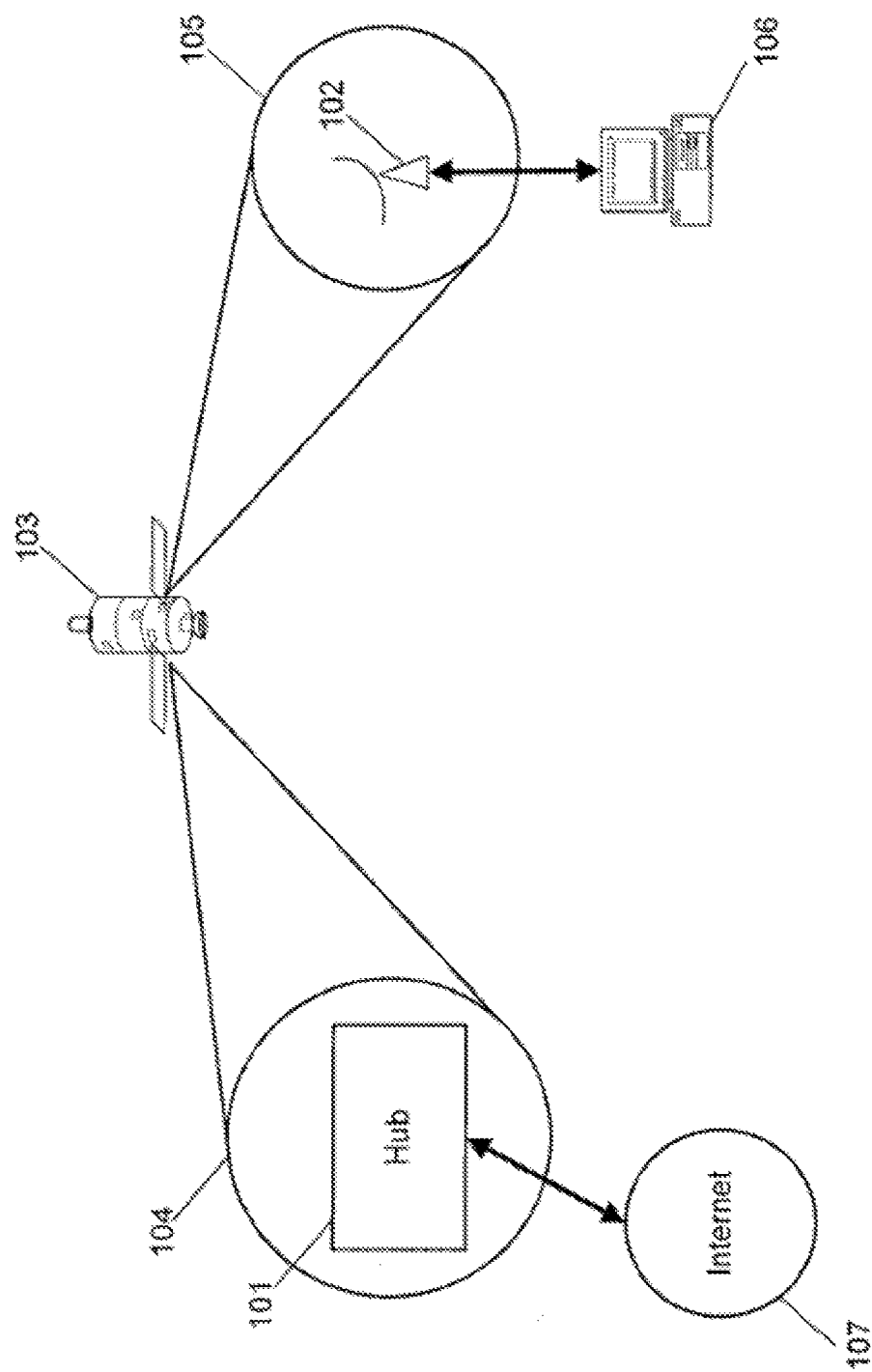
FIG. 1 depicts an example satellite communications system.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the technology disclosed herein are directed toward systems and methods for assigning user terminals in a satellite communications system. In particular, various embodiments disclosed herein provide a user terminal configured to select one out of the plurality of possible user spot beams for satellite communication. More particularly, some embodiments provide a terminal configured to determine which of the plurality of user spot beams of a multi-beam satellite is a preferred user spot beam for that terminal. The preferred user spot beam may be selected as that beam in which the user terminal is located closest to the center of the beam. In various embodiments, the terminal is configured to calculate a normalized distance metric for each of the plurality of user spot beams in which the terminal is located, and to use the calculated normalized distance metric to select the preferred user spot beam for communication.

Further embodiments disclosed herein provide a mobile terminal designed for use in a multi-satellite system. The mobile terminal may be configured to identify when it has entered the coverage area of multiple user spot beams from a plurality of satellites. The mobile terminal can determine which of the user spot beams is preferred for communications, and select the preferred user spot beam for communications. The mobile terminal can further be configured to change its beam assignment to a new spot beam in accordance with the technology disclosed herein. In various embodiments, the mobile terminal may be configured to reposition its antenna to allow communication over a different satellite.

Still other embodiments disclosed herein provide a method of designing a satellite communications network to increase the overall capacity and efficiency of the network. In various embodiments, the method may be conducted prior to the deployment of any satellites or the assignment of user terminals within the network. A first beam pattern and coverage area of a first satellite is determined. Regions within the coverage area of the first satellite where higher traffic and higher numbers of users are anticipated to be are identified. The user spot beams of the first beam pattern servicing those regions are identified. Implementing the technology disclosed herein, it is determined which of those user spot beams is the preferred beam by determining in which spot beam the region is closest to the beam's center. A second beam pattern is then designed for a second satellite wherein at least one of the user spot beams of the second pattern has its center fall closer to at least one of the identified regions such that the second satellite would constitute the preferred satellite for user terminals in that region to connect over.

FIG. 1 depicts an example of a satellite communication system with which the systems and methods disclosed herein may operate. The satellite communication system may include a hub (gateway, or satellite ground station) 101, a Very Small Aperture Terminal (VSAT) 102, a satellite 103, a gateway spot beam 104, a user spot beam 105, a remote host 106, and the Internet 107.

The hub 101 may be a satellite ground station, hub or gateway for a satellite communications system, and may be connected to the VSAT 102 through the satellite 103. Feeder links through the gateway spot beam 104 may carry data between the hub 101 and the satellite 103, and may include a forward uplink for transmitting data from the hub 101 to the satellite 103, and a return downlink for transmitting data from the satellite 103 to the hub 101. The hub 101 may be a high capacity, large antenna earth station with connectivity to ground telecommunications infrastructure, such as, for example, the Internet 107.

The VSAT 102 may be used by end users to access the satellite communications system. The VSAT 102 may include a remote satellite dish for receiving RF signals from and transmitting RF signals to the satellite 103, a satellite modem and other equipment for managing the sending and receiving of data, and one or more remote hosts 106, which may be computer systems or other electronic devices capable of network communications at a site remote from the hub 101. For example, the VSAT 102 may be used at a residence or place of business to provide access to the Internet 107. User broadband links through the user spot beam 105 may carry data between the satellite 103 and the VSAT 102 and may include a return uplink for transmitting data from the VSAT 102 to the satellite 103, and a forward downlink for transmitting data from the satellite 103 to the VSAT 102. The user broadband links may enable the provision of broadband service to the VSAT 102. Although various embodiments of the technology disclosed herein are discussed in reference to a VSAT, the technology is applicable to embodiments utilizing any other type of communications terminal used in satellite communications networks.

The satellite 103 may be any suitable communications satellite for connecting a gateway, such as, for example, the hub 101, to a VSAT, such as, for example, the VSAT 102. The satellite 103 may use small spot beams, such as the user spot beam 105, to optimize capacity and availability for user terminal and gateway access, with uplink and downlink frequencies reused between spot beams in a pattern to maximize capacity and coverage while minimizing co-frequency interference. The user spot beam 105 may have a coverage area, which may be the geographic region in which the VSAT 102 may be located and may be able to connect to the satellite 103 through the user spot beam 105. If the VSAT 102 is within the coverage area of the user spot beam 105, the VSAT 102 may be said to be within the user spot beam 105. Otherwise, the VSAT 102 may be said to be outside the user spot beam 105. Gateway coverage may be provided by gateway spot beams, such as, for example, the gateway spot beam 104. The hub 101 may be located within the gateway spot beam 104. The satellite 103 may provide VSAT coverage in two or more user spot beams. The VSAT 102 may be covered by the user spot beam 105.

The satellite 103 may provide bent-pipe connectivity between user spot beams, such as the user spot beam 105, and the gateway spot beam 104. A given uplink frequency band from a given user spot beam may be translated into a given downlink frequency band of a given gateway spot beam, and similarly, a given uplink frequency band from a given gateway spot beam may be translated into a given downlink frequency band of a given user spot beam. The satellite 103 may alternatively be part of a unidirectional satellite communications system. The principles of the technology disclosed herein also apply to other satellite architectures, such as regenerative designs, and to other ways of spectrum management, such as the use of alternate polarizations in addition to frequency.

The satellite 103 may use spot beams and frequency and polarization reuse to increase the total capacity of the system. Signals passing through the satellite 103 in the forward direction, toward the VSATs, may be based on the DVB S.2 standard (ETSI EN 302 307) using signal constellations up to and including at least 16-APSK. The signals intended to pass through the satellite 103 in the return direction, toward the hubs, may be based on the IPoS standard (ETSI TS 102 354). Other suitable signal types may also be used in either direction, including, for example higher data rate variations of DVB S.2.

The hub 101 may be connected to the Internet 107. The remote hosts 106 connected to VSAT 102 may connect to the Internet 107 through the satellite 103 and the hub 101. Data sent from the VSAT 102 to the Internet 107 may be transmitted to the satellite 103, then from the satellite 103 to the hub 101. The hub 101 may then transmit the data to the Internet 107. Data from the Internet 107 may be sent to the VSAT 102 by being transmitted to the hub 101, then to the satellite 103, and then to the VSAT 102.

The satellite communications system may also include, for example, gateway terrestrial network connectivity to a PSTN, private networks or other networks, along with connectivity to the Internet 107, service and network management systems, user equipment, interconnect infrastructure, and other infrastructure and components suitable for a satellite communications system.

Figure 2:
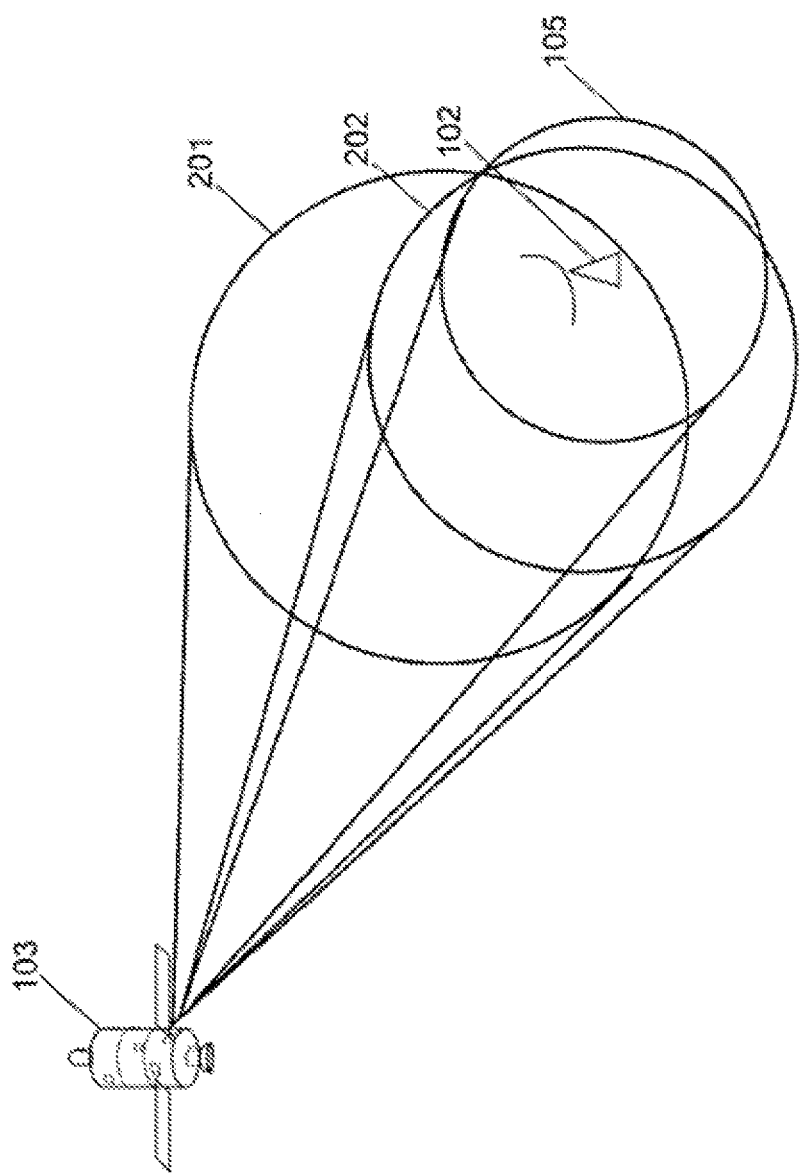
FIG. 2 depicts an example multibeam satellite communications system in which a VSAT is located within multiple spot beams.

FIG. 2 depicts an example multibeam satellite communications system in which a VSAT is located within multiple spot beams from a single satellite. The satellite 103 may have number of user spot beams in addition to the user spot beam 105, such as, for example, the user spot beam 201 and the user spot beam 202. Each of the user spot beams 105, 201 and 202 may have a possibly unique radius, outside of which the user spot beam may be visible to the VSAT 102, but may not be considered usable. The user spot beams 105, 201, and 202 may provide overlapping coverage in some areas, and the VSAT 102 may need to determine which of the user spot beams 105, 201, or 202 to use to connect to the satellite 103.

The VSAT 102 may use its own location; the locations, sizes, and shapes of the available user spot beams; and parameters set by the operator of the satellite communications system to determine which of the available user spot beams the VSAT 102 should use. For example, the VSAT 102 may compare its own location, in latitude and longitude, to the known coverage area of the available user spot beams, to determine which of the user spot beams the VSAT 102 is located within. The performance of user spot beam for the VSAT 102 may be inversely proportional to the square of the VSAT 102's distance from the center of the user spot beam in a coordinate system appropriate to the antenna performance, such as an azimuth-elevation coordinate system. Accordingly, in various embodiments the VSAT 102 calculates its distance from the center of the available user spot beams to determine which user spot beam may provide the VSAT 102 with the best connection. The operator of the satellite communications system may also assign weights to the user spot beams, which may cause the VSAT 102 to be more likely to select one user spot beam over another, for example, as part of a load balancing scheme.

The VSAT 102 may use its distance from the center of a user spot beam, i, and a weight assigned to that user spot beam to calculate a normalized distance metric $D_i$ for the user spot beam. The normalized distance metric $D_i$ may be calculated according to equation:

$$D_i = \left( \frac{\sqrt{(x-x_i)^2 + (y-y_i)^2}}{R_i} \right)^{w_i} \quad (1)$$

where (x, y) may give the location of the VSAT 102 in horizontal (az/el) or U/V coordinates, $(x_i, y_i)$ may give the location of the center of the user spot beam i in az/el or U/V coordinates, $R_i$ may be the radius of the user spot beam i, and $W_i$ is the weight given to the user spot beam i, for example, by the operator. $W_i$ may be set to 2 by default if no other weight has been assigned to the user spot beam i. The smaller the $D_i$ is for a given user spot beam, the more likely the VSAT 102 may be to use that user spot beam. A given beam I may have multiple weights $W_i$ assigned to it, one $W_i$ for each adjacent beam. When the $D_i$ metric is calculated for each of the adjacent beams, the corresponding $W_i$ would be used for that adjacent beam.

Figure 3:
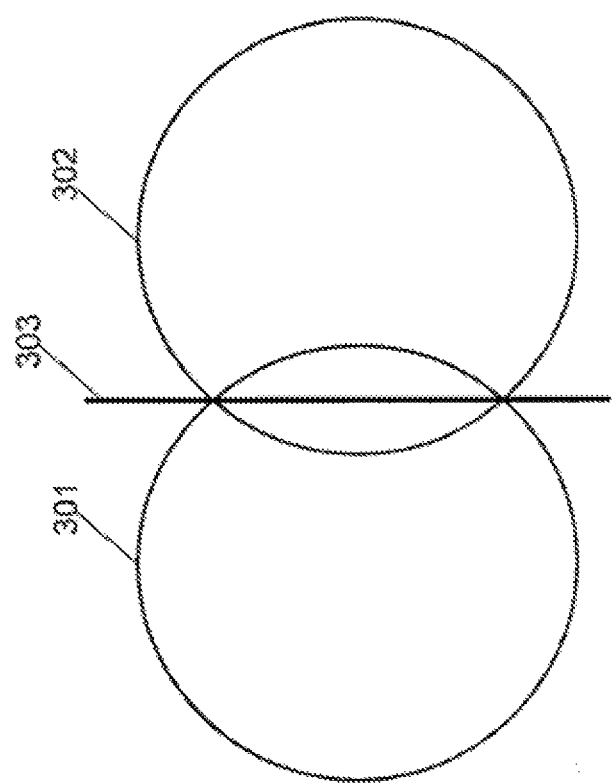
FIG. 3 depicts an example plot of two user spot beams with equal beam sizes.

FIG. 3 depicts an example plot of two user spot beams with equal beam sizes. A user spot beam 301 and a user spot beam 302 may be user spot beams of equal size originating from the satellite 103. A locus of points for which the metric $D_i$ from the centers of the user spot beams 301 and 302 is equal may be termed an "equimetric" line 303. The equimetric line 303 may represent possible locations of the VSAT 102 with respect to the user spot beam 301 and the user spot beam 302 for which the $D_i$ metric is equal and hence for which the user spot beam 301 and 302 may be equivalent choices for the VSAT. The line 303 may be the locus of locations for the VSAT 102 where the VSAT 102 would calculate equal $D_i$'s for the user spot beam 301 and the user spot beam 302 if the user spot beams 301 and 302 are given equal weight. The equimetric line 303 may indicate that if the VSAT 102 is located to the left of the equimetric line 303 and within the user spot beam 301, the VSAT 102 should use the user spot beam 301, and if the VSAT 102 is located to the right of the equimetric line 303 and within the user spot beam 302, the VSAT 102 should use the user spot beam 302.

Figure 4:
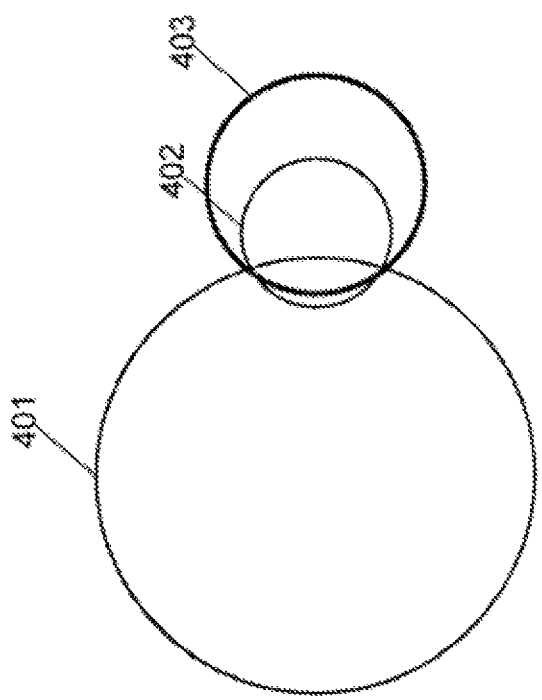
FIG. 4 depicts an example plot of two user spot beams with unequal beam sizes.

FIG. 4 depicts an example plot of two user spot beams with unequal beam sizes. A user spot beam 401 and a user spot beam 402 may be user spot beams of different size originating from the satellite 103. An equimetric line 403 may be the locus of locations for the VSAT 102 where the VSAT 102 would calculate equal $D_i$'s for the user spot beam 401 and the user spot beam 402 if the user spot beams 401 and 402 are given equal weight. The equimetric line 403 may indicate that if the VSAT 102 is located outside of the equimetric line 403 and within the user spot beam 401, the VSAT 102 should use the user spot beam 401, and if the VSAT 102 is located inside the equimetric line 403 and within the user spot beam 402, the VSAT 102 should use the user spot beam 402. The VSAT 102 may use the user spot beam 402 from more locations in the overlap area between the user spot beam 401 and the user spot beam 402, as the $D_i$ for the user spot beam 402 may be lower in most locations in the overlap area due to the smaller size of the user spot beam 402.

Figure 5:
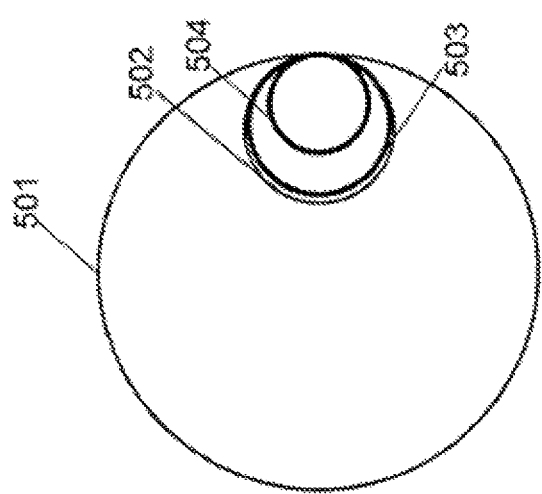
FIG. 5 depicts an example plot of two user spot beams with unequal beam sizes and overlapping coverage.

FIG. 5 depicts an example plot of two user spot beams with unequal beam sizes and overlapping coverage. A user spot beam 501 and a user spot beam 502 may be user spot beams of different size originating from the satellite 103, with the coverage area of the user spot beam 502 contained within the coverage area of the user spot beam 501. An equimetric line 503 may be the locus of locations for the VSAT 102 where the VSAT 102 would calculate equal $D_i$'s for the user spot beam 501 and the user spot beam 502 if the user spot beam 501 is given a weight of 2 and the user spot beam 502 is given a weight of 8. The unequal weights may indicate that the operator of the satellite communications systems would prefer that VSATs, such as the VSAT 102, use the user spot beam 502. An equimetric line 504 may be calculated using equal weights. The equimetric line 503 may indicate that if the VSAT 102 is located outside of the equimetric line 503 and within the user spot beam 501, the VSAT 102 should use the user spot beam 501, and if the VSAT 102 is located inside the equimetric line 503 and within the user spot beam 502, the VSAT 102 should use the user spot beam 502. The same may apply to the equimetric line 504. Because the weight of the user spot beam 502 is higher for the calculation for the equimetric line 503, the VSAT 102 may use the user spot beam 502 from more locations within the user spot beam 502 as compared to when the weights for the user spot beams 501 and 502 are equal, as in the calculation of the equimetric line 504. With equal weights, there will be fewer locations within the user spot beam 502 from which the VSAT 102 would use the user spot beam 502 instead of the user spot beam 501.

Figure 6:
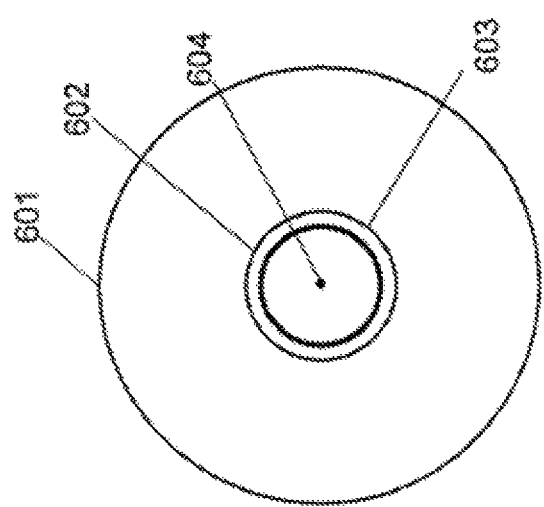
FIG. 6 depicts an example plot of two user spot beams with unequal beam sizes and concentric coverage.

FIG. 6 depicts an example plot of two user spot beams with unequal beam sizes and concentric coverage. A user spot beam 601 and a user spot beam 602 may be user spot beams of different size originating from the satellite 103, with the coverage area of the user spot beam 602 contained within the coverage area of the user spot beam 601, and both of the user spot beams 601 and 602 having the same center. An equimetric line 603 may be the locus of locations for the VSAT 102 where the VSAT 102 would calculate equal $D_i$'s for the user spot beam 601 and the user spot beam 602 if the user spot beam 601 is given a weight of 2 and the user spot beam 602 is given a weight of 8. An equimetric line 604 may be calculated using equal weights. The equimetric line 603 may indicate that if the VSAT 102 is located outside of the equimetric line 603 and within the user spot beam 601, the VSAT 102 should use the user spot beam 601, and if the VSAT 102 is located inside the equimetric line 603 then the VSAT 102 should use the user spot beam 602. The equimetric line 504 may be a point at the shared center of the user spot beam 601 and the user spot beam 602, because with equal weights, the $D_i$ for the user spot beam 601 may always be less than the $D_i$ for the user spot beam 602 for any location of the VSAT 102 due to the greater radius of the user spot beam 601. Thus, with equal weights, the VSAT 102 may always use the user spot beam 601 so long as the VSAT 102 is located within the user spot beam 601, unless the VSAT 102 is at the center of the user spot beam 601, in which case either of the user spot beams 601 and 602 may be used. Because the weight of the user spot beam 602 is higher for the calculation for the equimetric line 603, the VSAT 102 may use the user spot beam 602 from more locations within the user spot beam 602 as compared to when the weights for the user spot beams 601 and 602 are equal. With concentric user spot beams, weighting may be used to ensure proper load balancing between the concentric user spot beams.

Figure 7:
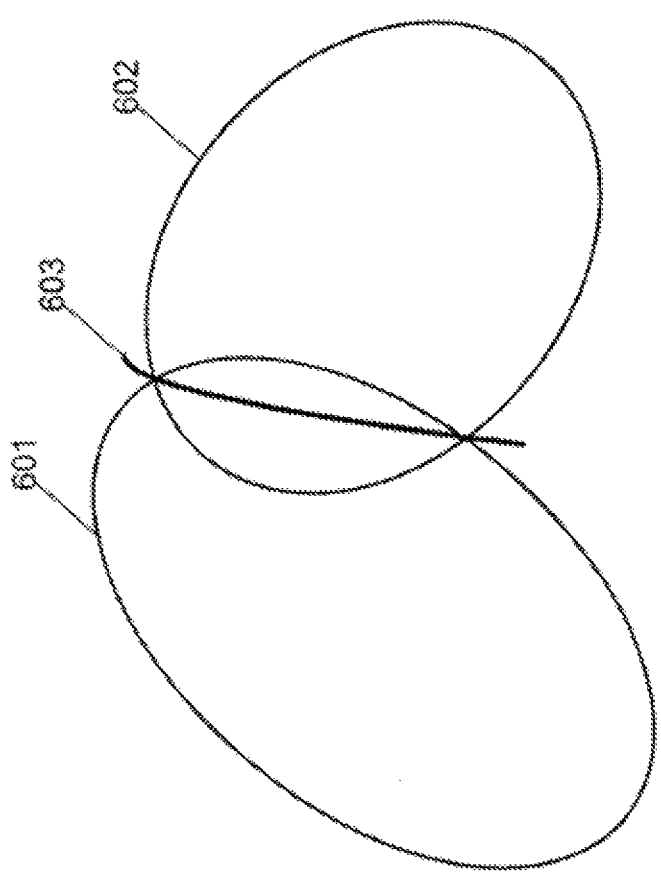
FIG. 7 depicts an example plot of two user spot beams with elliptical beam shapes.

Not all user spot beams may have coverage areas with circular shapes. Some user spot beams may be, for example, elliptical. FIG. 7 depicts an example plot of two user spot beams with elliptical beam shapes. A user spot beam 701 and a user spot beam 702 may be user spot beams of different size originating from the satellite 103, and with elliptical shapes. Because the user spot beams 701 and 702 are elliptical, the radius $R_i$ used for calculating $D_i$ may no longer be a constant, but may instead be a function of the angle between the centroid of the elliptical shape of the user spot beam 701 or 702 and the location of the VSAT 102. $R_i$ may be calculated based on the angle $\theta_i$ of the line from the centroid to the location of the VSAT 102. The angle $\theta_i$ may be calculated according to the equation:

$$\theta_i = \arctan((y-y_{0i})/(x-x_{0i})) \quad (2)$$

where (x,y) may give the location of the VSAT 102 as in equation (1), and $(x_{0i}, y_{0i})$ may give the location of the centroid of the user spot beam. $\theta_i$ may then be used to calculate the value of $R_i$ for the given location of the VSAT 102 according to the equation:

$$R_i = \sqrt{\left(\left(\begin{array}{c}R_{1i}*\cos(\theta_i-a_i)*\cos(a_i) - R_{2i}*\sin(\theta_i-a_i)*\sin(a_i)^2 + \\ (R_{2i}*\sin(\theta_i-a_i)*\cos(a_i) + R_{1i}*\cos(\theta_i-a_i)*\cos(a_i))\end{array}\right)^2\right)} \quad (3)$$

where $R_{1i}$ may be the semi-major axis, $R_{2i}$ may be the semi-minor axis, and $a_i$ may be the tilt angle, or the angle of the ellipse with respect to the X-axis. Using equation (3) for $R_i$ in conjunction with equation (1), $D_i$ values may be calculated for the various possible locations of the VSAT 102, resulting in an equimetric line 703. If the VSAT 102 is to the left of the equimetric line 703 and inside the user spot beam 701, the VSAT 102 may use the user spot beam 701, and if the VSAT 102 is to the right of the equimetric line 703 and inside the user spot beam 702, the VSAT may use the use spot beam 702.

Figure 8:
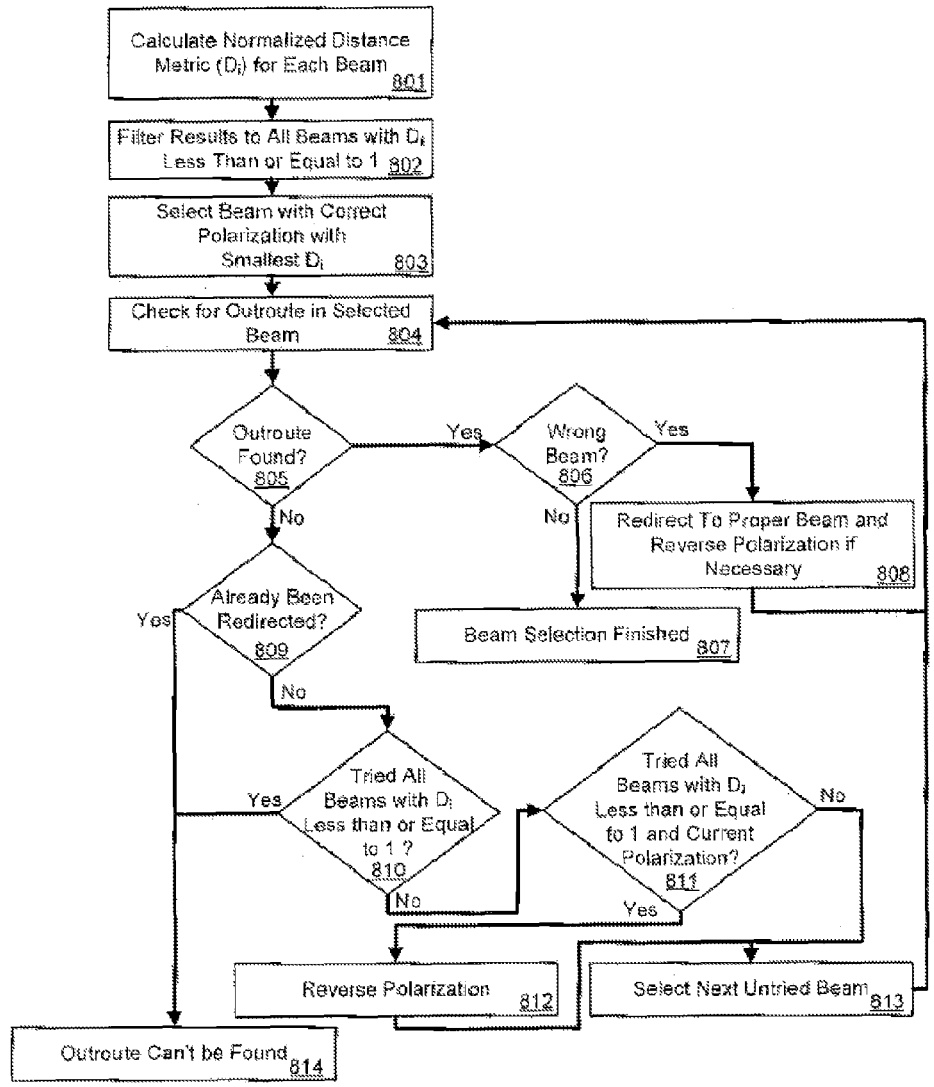
FIG. 8 depicts an example procedure for performing user spot beam selection in a multibeam satellite communications system.

The calculation of an equimetric line may be useful in determining locations for possible VSATs, or locations and load balancing for user spot beams. If a VSAT, such as the VSAT 102, is being installed at a particular fixed location, the VSAT 102 may need to determine for itself which available user spot beam to use. FIG. 8 depicts an example procedure for performing user spot beam selection in a multibeam satellite communications system. In block 801, the VSAT 102 may calculate the normalized distance metric $D_i$ for available user spot beams. The VSAT 102 may have a table of user spot beam centers in, for example, az/el coordinates and radii for each user spot beam from the satellite 103. The VSAT 102 may also know, or be able to calculate from its GPS position, the location of the VSAT 102 in, for example, az/el coordinates. The VSAT 102 may then use the table of user spot beam centers and radii and the VSAT 102's own location in conjunction with equation (1), and, if the user spot beams are not circular, equations (2) and (3), to calculate $D_i$ for the user spot beams from the satellite 103. If the VSAT 102 is also within the user spot beam of an additional satellite, the VSAT 102 may calculate $D_i$ for those user spot beams as well. For example, VSAT 102 as depicted in FIG. 2 may calculate $D_i$ for the user spot beams 105, 201, and 202.

In block 802, the VSAT 102 may filter the list of user spot beams to include only those user spot beams with a $D_i$ of less than one. If the VSAT 102 calculates the $D_i$ of a user spot beam as greater than one, that may indicate that the VSAT 102 is located outside of the coverage area of that user spot beam, and therefore cannot use that user spot beam to connect to the satellite 103. For some variations on equation (1), the threshold for the filtering of the list may be number different from one, and may vary depending on how is being $D_i$ calculated. Other, additional, filters may be considered, such as business limits on the number of users permitted in a particular beam or the perceived signal to noise ratio of that beam.

In block 803, the VSAT 102 may select the user spot beam with the lowest $D_i$ and the correct polarizer settings. The user spot beam with the smallest $D_i$ may provide the better performance than the user spot beams with larger $D_i$'s, or may be weighted more highly by the operator of the satellite communication's system. A polarizer in the VSAT 102 may be set by, for, example, a person installing the VSAT 102, based on an estimate of which of the user spot beams the VSAT 102 will use. The installer may need to indicate to the Indoor Unit (IDU) component of the VSAT 102 which polarizer setting was chosen during the polarizer setup. For example, if VSAT 102 determined the smallest $D_i$ for the user spot beam 105, and the user spot beam 105 has the correct polarizer settings, the VSAT 102 may select the user spot beam 105.

In block 804, the VSAT 102 may check for an outroute in the select user spot beam. The outroute may be a connection to the satellite 103 carried on the user spot beam. For example, if the VSAT 102 selected the user spot beam 105 in block 803, the VSAT 102 may attempt to connect to the satellite 103 through the user spot beam 105.

In block 805, the VSAT 102 may determine if an outroute was found. If the VSAT 102 was able to find an outroute in the selected user spot beam, for example, the VSAT 102 was able to connect to the satellite 103 through the user spot beam 105, flow proceeds to block 806. Otherwise, if no outroute is found, for example, the VSAT 102 is unable to establish a connection with the satellite 103 through the user spot beam 105, flow proceeds to block 809.

In block 806, the VSAT 102 may determine that the selected user spot beam is the wrong beam. Once the VSAT 102 has found an outroute, the VSAT 102 may connect with the satellite 103. The satellite 103 may indicate to the VSAT 102 that the VSAT 102 is on the wrong user spot beam. For example, the VSAT 102 may select the user spot beam 105, and then attempt to find an outroute on which to connect to the satellite 103. The VSAT 102 may find an outroute and connect to the satellite 103, but the satellite 103 may indicate that the VSAT 102 may not use the outroute on the user spot beam 105, and is therefore on the wrong user spot beam. If the VSAT 102 is on the wrong user spot beam, flow proceeds to block 808. Otherwise, flow proceeds to block 807.

In block 807, the VSAT 102 has finished selecting and connecting to a user spot beam. Once the VSAT 102 has selected a user spot beam, found an outroute on the selected user spot beam, connected to the satellite 103 on the outroute, and confirmed that the outroute is on the selected user spot beam, the VSAT 102 may be connected to the satellite communications system. The VSAT 102 may then provide access to, for example, the Internet 107, to the remote host 106.

In block 808, the VSAT 102 may be redirected to the proper user spot beam, and may also reverse the VSAT 102's polarization. If the VSAT 102 found an outroute, but was told by the satellite 103 that the outroute was on the wrong user spot beam, the satellite 103 may redirect the VSAT 102 to the proper user spot beam. The VSAT 102 may also need to reverse polarization, if the proper use spot beam uses the reverse polarization from the VSAT 102's current polarization. Flow may then proceed back to block 904, where the VSAT 102 may attempt to find and connect to an outroute in the user spot beam to which the VSAT 102 was redirected.

In block 809, the VSAT 102 could not find an outroute, and may determine if the VSAT 102 has previously been redirected to a different user spot beam by the satellite 103. If the VSAT 102 has previously been redirected, for example, the satellite 103 told the VSAT 102 that the VSAT 102 was one the wrong beam in block 806 and the VSAT 102 was redirected to the proper user spot beam in block 808, flow proceeds to block 814. If the VSAT 102 has not been previously redirected, for example, the VSAT 102 was unable to find an outroute in the selected user spot beam from block 803, flow proceeds to block 810.

In block 810, the VSAT 102 may determine if the VSAT 102 has attempted to find an outroute on all user spot beams with a $D_i$ less than or equal to one. If the VSAT 102 has not tried to find an outroute on all user spot beams with a $D_i$ less than or equal to one, for example, there are still untried user spot beams on the filtered list from block 802, flow proceeds to block 811. Otherwise, flow proceeds to block 814.

In block 811, the VSAT 102 may determine if the VSAT 102 has attempted to find an outroute on all user spot beams with a $D_i$ less than or equal to one and with the same polarization as the current polarization of the VSAT 102. If the VSAT 102 has not tried to find an outroute on all user spot beams with a $D_i$ less than or equal to one and the same polarization as the VSAT 102, for example, there are still untried user spot beams on the filtered list from block 802 that also have the same polarization as the VSAT 102, flow proceeds to block 813. Otherwise, flow proceeds to block 812.

In block 812, the VSAT 102 may reverse its own polarization. The VSAT 102 may have already tried to find an outroute on all of the user spot beams with a with a $D_i$ less than or equal to one and the same polarization as the VSAT 102. The remaining untried user spot beams with a with a $D_i$ less than or equal to one may have a polarization opposite of the current polarization of the VSAT 102. The VSAT 102 may reverse its own polarization, so that the VSAT 102 can attempt to find an outroute on the untried user spot beams.

In block 813, the VSAT 102 may select the next untried use spot beam with a $D_i$ less than or equal to one. The next untried user spot beam may have the same polarization as the VSAT 102, because either the VSAT 102 determined in block 811 that not all of the user spot beams with the same polarization as the VSAT 102 had been tried, or the VSAT 102 reversed its own polarization in the block 812 to try the untried user spot beams that had a polarization opposite the polarization the VSAT 102 had been using before block 812. The untried user spot beam selected may be the untried user spot beam with the lowest $D_i$ of all of the untried user spot beams. Flow may proceed back to block 804, where the VSAT 102 may attempt to find an outroute on the selected user spot beam.

In block 814, the VSAT 102 may report that an outroute cannot be found. The VSAT 102 may have found an outroute, been redirected by the satellite 103 to the proper user spot beam in block 808, and been unable to find to find an outroute on the proper user spot beam, or the VSAT 102 may have tried to find an outroute on every user spot beam with a $D_i$ less than or equal to one in both polarizations, and been unable to find an outroute. The VSAT 102 may issue a report or error message to, for example, a person installing the VSAT 102, indicating that the VSAT 102 was unable to find an outroute and further troubleshooting steps may be needed.

The determination of the "best" beam on the "best" satellite is also relevant to mobile terminals. As customer demand for in-flight internet access continues to grow, the number of mobile terminals will increase. Compared to stationary terminals, like a VSAT, a mobile terminal does not remain in a fixed location. Indeed, the mobile terminal can move from location to location in real time, sometimes at great speed such as the example of an aircraft. Accordingly, determination of the "best" beam is not a static determination, but changes over time as the mobile terminal moves among different user spot beams, or even different coverage areas for different satellites. Moreover, as utilized herein, the term "best" may not necessarily suggest an absolutely optimum beam or satellite, but can also suggest a preferred beam or satellite.

Figure 9:
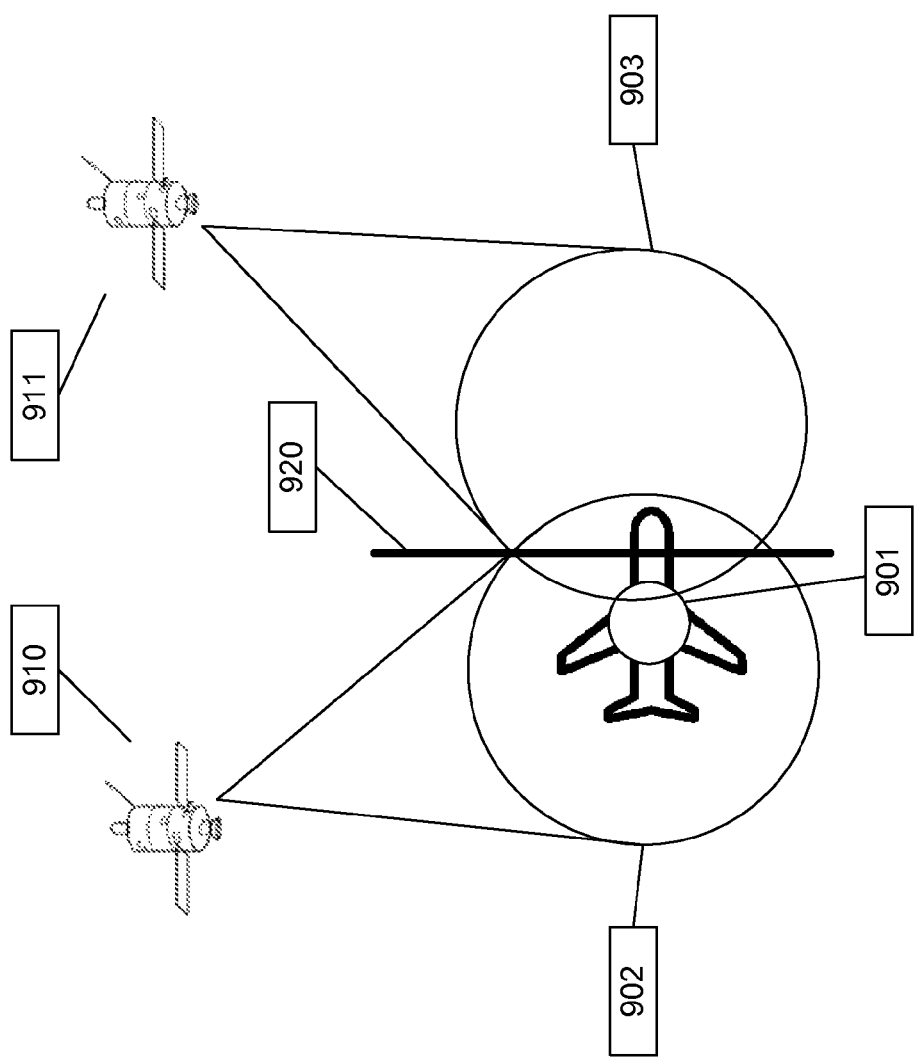
FIG. 9 depicts an example mobile communications terminal at a first point of transit in a multi-satellite communications system.
Figure 10:
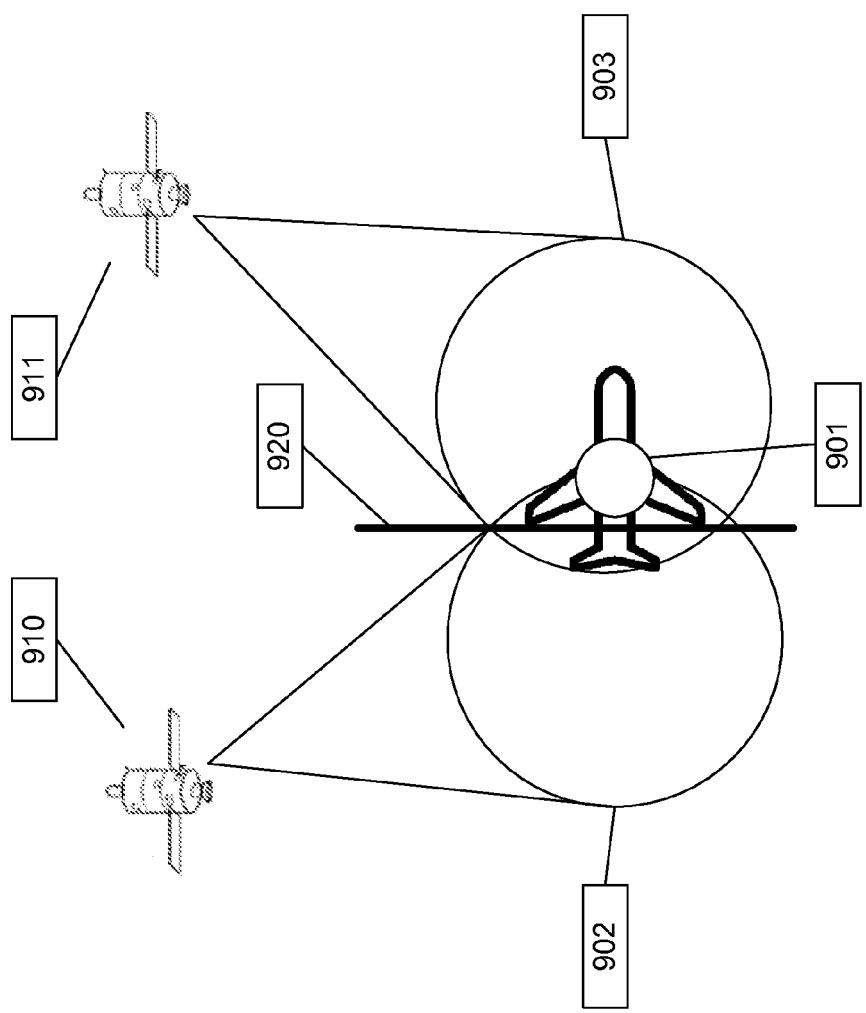
FIG. 10 depicts an example mobile communications terminal at a second point of transit in a multi-satellite communications system.

FIGS. 9 and 10 illustrate an example scenario of a mobile terminal in transit. In various embodiments as noted above, a mobile terminal can include a terminal that moves from one location to another such as, for example, a terminal in an automobile, train, plane, boat or other vessel. For ease of understanding and clarity of description, this document describes FIGS. 9 and 10 in terms of an example scenario in which the mobile terminal is a satellite terminal on an aircraft, which may be referred to from time to time herein in shorthand as an aeronautical terminal. However, after reading this description, one of ordinary skill in the art will understand that this process can be applied to other types of mobile terminals in a multi-beam or multi-satellite system as well as the static case of a fixed terminal in a multi-satellite system.

In the example illustrated in FIG. 9, the aeronautical terminal 901 is covered by two user spot beams—user spot beam 902 from satellite 910, and user spot beam 903 from satellite 911. In this example, both user spot beams 902, 903 are of equal diameter. An equimetric line 920 may be defined as the locus of locations for the aeronautical terminal 901 at which the aeronautical terminal 901 would calculate equal $D_i$'s for the user spot beams 902 and 903.

Similar to the example of FIG. 3, when the aeronautical terminal 901 is to the left of equimetric line 920 and within user spot beam 902, the aeronautical terminal 901 should use the user spot beam 902 and satellite 910. When the aeronautical terminal 901 is to the right of equimetric line 920 and within user spot beam 903, the aeronautical terminal 901 should use the user spot beam 903 and satellite 911. In the example of FIG. 9, the aeronautical terminal 901 is to the left of the equimetric line 920, indicating that it should select satellite 910 and user spot beam 902.

However, as shown in FIG. 10, as the aircraft on which the aeronautical terminal is housed moves, aeronautical terminal 901 transitions from the left side of the equimetric line 920, to the right side. Similar to FIG. 3, user spot beam 903 and satellite 911 are now the "best" beam and satellite for aeronautical terminal 901. Aeronautical terminal 901 could still be served by user spot beam 902. However, because aeronautical terminal 901 is near the edge of user spot beam 902, if it were to remain with user spot beam 902 additional resources would be required to ensure the same quality of service. Therefore, unless aeronautical terminal 901 were to switch assignment, the overall capacity of satellite 910 will be reduced because of the extra resources necessary to ensure the same quality of service to aeronautical terminal 901 at the edge of beam 902. Therefore, in various embodiments, systems and methods can be implemented to provide a handoff for the aeronautical terminal 901 from user spot beam 902 to user spot beam 903 when the aeronautical terminal crosses equidistant line 920. Likewise, in various embodiments, distance calculations can be made to calculate the normalized distance metric $D_i$ for all available user spot beams for the user terminal on a continuous, regular, random or periodic basis. And, from these calculations, the "best" spot beam selected for the aeronautical terminal 901 based on its location at that time.

Figure 11:
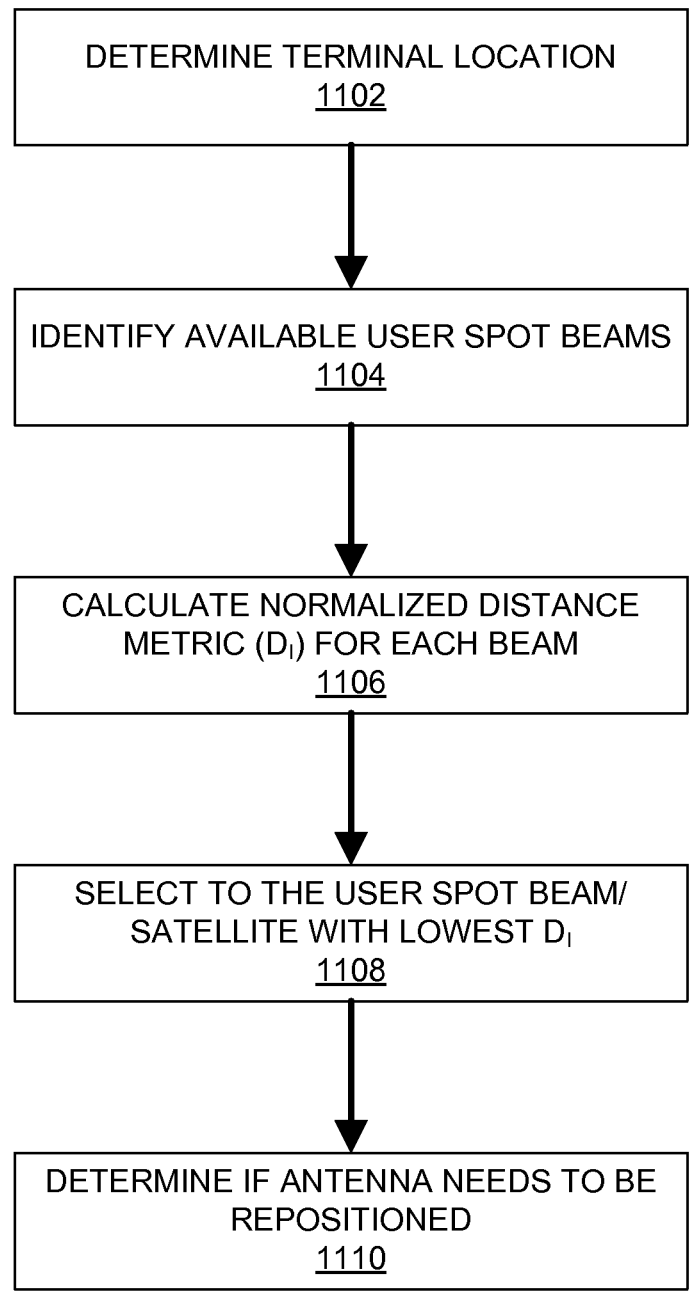
FIG. 11 depicts an example process for user spot beam and satellite assignment of a mobile terminal while in transit in a multi-satellite system.

FIG. 11 illustrates an example process for performing user spot beam and satellite assignment of a mobile terminal while in transit in a multi-satellite system. In some embodiments, the mobile terminal may be configured to begin the process with an initially assigned user spot beam. For example, the mobile terminal may determine a spot beam for communications for its location at or prior to departure (e.g. prior to take off in the case of an aeronautical application). This can be done with a procedure that is similar to that of a stationary terminal, such as the procedure described in FIG. 8 for VSAT 102. In other embodiments, a mobile determination procedures such as that outlined with respect to FIG. 11 can be used to determine the position of the mobile terminal prior to or at the time of its departure.

Referring now to FIG. 11, at operation 1102, the mobile terminal (e.g., aeronautical terminal 901) determines its current location. The current location can be determined based on, for example, a position determination system (e.g., using a GPS, GLONASS, the Galileo, or other positioning system), deduced reckoning (automatically or manually calculated), manual position entry (e.g., user input), receipt of position information from another device, or other location determination mechanisms.

At operation 1104 the mobile terminal identifies the available user spot beams based on its current location. Particularly, in some embodiments, the mobile terminal compares its determined location with available user spot beams providing coverage that location to identify user spot beams available to the terminal at that location. User spot beams may, for example, be stored in memory accessible by the mobile terminal. In some embodiments, for example, the mobile terminal may have access to a table of user spot beams and their parameters. These parameters can include, for example, beam centers, being radii, beam shapes, or other parameters that can be used to calculate the normalized distance metric $D_i$ for these available user spot beams. In various embodiments, this information may be preinstalled in memory on or accessible by the mobile terminal, or it can be stored in other locations accessible to the mobile terminal such as, for example, in the cloud. The ultimate storage location for this information is not critical provided it is accessible by the mobile terminal for selecting the "best" beam. The information provided may be updated periodically to capture changes in satellite beam patterns. Such changes can include, for example, the addition of new satellites, the removal of old satellites, the repositioning of user spot beams, variations in user spot beam parameters over time, and other changes that may affect the calculation of the normalized distance metric.

In other embodiments, the mobile terminal may be configured to identify available user spot beams by using a scanning antenna to search for user spot beams in a predetermined scanning pattern. Such spot beams can be determined, for example, by scanning for the presence of RF signals in the designated frequency bands, and determining whether the appropriate signaling is present on those signals, such as elements following the predefined MAC protocols for the user spot beams.

At operation 1106, the mobile terminal calculates the normalized distance metric $D_i$ for all available user spot beams. As discussed above, the shape of user spot beams may be different. Accordingly, mobile terminal 901 may calculate the normalized distance metric using equation (1) for circular beams, or equations (2) and (3) for non-circular beams.

The weight $W_i$ used in either case may differ between user spot beams (whether or not on the same satellite), or between different satellites themselves. That is, it may be desirable in certain scenarios to give some level of preference to one satellite over another based on factors other than or in addition to the normalized distance metric. These other factors can include, for example, the loading of a given satellite, the relative loading of multiple satellites, the quality of service available for a given user beam or satellite, the availability of encryption or other security mechanisms, the reliability of the connection (independent of the normalized distance metric), and so on.

To illustrate, consider an example of loading to determine a weighting factor. If one satellite has a much lower load than another, the weighting factor may be used to weigh in favor of using the satellite with the lighter load. Accordingly, the weighting factor can indicate the relative loading between satellites or it can indicate the loading of a given satellite. In some instances, the weighting factor can be used as the sole mechanism for determining a user spot beam, while in other embodiments, the weighting factor is merely one factor considered along with the normalized distance measurement. For example, the loading on a particular satellite may be so great such that its weighting factor dictates that the subject satellite may not be selected by the mobile terminal as long as other beams are available to the mobile terminal at its given location. This can help to prevent overloading of a given satellite resource.

In further embodiments, a threshold can be established to trigger the use of the weighting factor. For example, in some embodiments the system can be configured to consider the weighting factor only if the difference between the normalized distance measurements between the subject beams is less than a certain amount. That is, if the normalized distance metrics of overlapping beams from two satellites are close enough that the quality of service will not suffer materially, the weighting factor may be used to drive the selection. On the other hand, if the normalized distance metrics of these overlapping beams are so different that the quality of service might be impacted materially if one beam were selected over the other, then the weighting factor might not apply or might be given less weight.

As another example, the system can be configured to adjust this difference threshold based on the strength of the weighting factor. That is for larger weighting factors (e.g. the greater the difference in loading, or the more critical the loading on a given satellite), a greater difference in the normalized distance measurement is tolerated to allow the weighting factor to influence the decision to select the beam with the larger normalized distance metric.

As these examples serve to illustrate, other factors in addition to the normalized distance metric can be used to affect the beam assignment of a mobile terminal, and can aid in increasing the overall capacity, efficiency, or performance of the system. This can be done, for example, by including in the assignment determination process factors such as available capacity, performance, quality of service, and so on.

At operation 1108, the mobile terminal selects the designated user spot beam and associated satellite having the lowest normalized distance metric. As noted above, this decision can be made considering various weighting factors as well. It should be noted that in various embodiments, the mobile terminal may include a polarizer. The mobile terminal may be configured to select the satellite based not only on whether that satellite has the user spot beam with the "best" performance, but also whether that user spot beam is the correct polarization based on the setting of the mobile terminal's polarizer. In some embodiments, the polarizer of the mobile terminal may be switchable, and the mobile terminal may be configured to switch the polarizer to match the polarization of the selected user spot beam.

In various embodiments, the mobile terminal can further be configured to determine whether it's antenna needs to be repositioned to point to the selected satellite. Accordingly, at operation 1110, the mobile terminal determines whether the antenna of the mobile terminal needs to be repositioned to connect with the selected satellite. If the antenna is already directed towards the satellite, no repositioning is necessary and the mobile terminal 901 can begin the steps of establishing an outroute, as discussed in FIG. 8. If, on the other hand, the antenna is not directed toward the satellite, the antenna can be adjusted to improve its pointing. In some embodiments, therefore, the antenna may be mounted on a steerable mount (e.g. an az-el, equatorial, or X-Y mount) to facilitate redirecting the antenna. In other embodiments, phased-array antennas can be used to provide electronic beam steering.

Although embodiments described herein are described with the mobile terminal performing the user spot beam selection, alternative embodiments may be implemented in which this calculation is performed by a computing module outside of or separate from the mobile terminal, and the user beam selection communicated to the mobile terminal. Likewise, the various computing steps described herein can be shared between the mobile terminal and such an external device. In the embodiments described above the position of the mobile terminal and the computation of the "best" spot beam based on terminal location can be determined in near-real-time as the mobile terminal travels from one location to another. In other embodiments, a route for the mobile terminal can be mapped out in advance, and the user spot beam determinations made in advance as well. Therefore, in some embodiments, the user spot beams can be predetermined or preselected for a given route, and the selections stored such that the mobile terminal can make the appropriate beam selections based on these precalculated determinations, as a mobile terminal is en route. For example, route milestones or waypoints for handoff can be calculated and provided to the mobile terminal such that the mobile terminal can make a transition to the appropriate user beam when each waypoint is reached. Accordingly, predetermined routes and their associated beam selections along those routes can be calculated and stored for use in transit.

In embodiments described above, the mobile terminal (or other beam selection module) computes the normalized distance metric for a plurality of beams to make a determination. As noted above, this can be done based on the parameters stored in a table or other memory. In other embodiments, a plurality of different coordinates (e.g., defined by latitude and longitude) can be stored in memory along with their corresponding associated "best" beams for each coordinate. Accordingly, the mobile terminal can be configured to use its current location (e.g., in latitude and longitude) to look up the best beam for that current location. While this may require memory to store the location coordinates and their corresponding "best" beams, this can ease the calculation burden for real-time position determination's as a table or other memory lookup may typically be less computationally intensive then measuring normalized distance metrics for a plurality of beams.

In yet another embodiment, a plurality of equimetric lines can be computed in advance for the various spot beams. These equimetric lines can be used to define boundaries for a given spot beam. Accordingly, location coordinates can be compared with the boundaries defined by the various equimetric lines to determine which user spot beam is the "best" spot beam for that given location. For example, in a two-beam situation, the system may determine that the mobile terminal is to one side of a given equimetric line and the appropriate spot beam chosen on that basis. As another example, in a three-beam situation, the system may choose a spot beam based on a determination that the mobile terminal is to one side of a first equimetric line, and also to one side of a second equimetric line.

As discussed above, the performance of a user spot beam for a particular user terminal may be inversely proportional to the square or the terminal's distance from the center of the beam. This is due to the fact that the performance of user terminals typically depends on factors such as the effective isotropic radiated power (EIRP), the antenna gain-to-noise temperature ratio (G/T), and the carrier-to-interference ratio (C/I) of the satellite the terminal is connected to at the particular geodetic location. The EIRP and G/T of each beam will vary from the center of the beam to the beam edges. Users nearer to the center of the beam tend to perform better than users near the edge of the beam. In this context, "better" means that the broadband links operate at a higher signal to noise plus interference (S/(N+I)) ratio. In satellite systems using adaptive coding and modulation (ACM), with a given number of users, if there are more users nearer to the center of a beam, the aggregate capacity of the system is greater than if there are fewer users nearer to the center of the beam.

Further, it may be reasonably assumed that the pattern of a circular satellite beam is parabolic, meaning that the number of decibels (dB) of EIRP and G/T down from beam center varies proportionally to the square of the normalized distance metric. If the system signal to noise (SNR) is dominated by the user link, changes in EIRP or G/T will almost directly translate into changes in SNR. Although in practice efficiency in modulation and coding (modcods) changes in discrete steps as the SNR varies when considering the average of many user terminals operating at slightly different SNRs these individual discrete steps "smear" into an essentially smooth, nearly linear function. In a typical digital video broadcasting-satellite (e.g., a second generation (DVB-S2) based system), efficiency varies approximately linearly with the SNR of the satellite. Under published DVB-S2 performance figures for 8PSK and 16APSK modulations, the slope of efficiency versus SNR is about 10% per dB near the middle of the range. Assuming that the EIRP of a satellite changes 5 dB from beam center to beam edge, this equates to users at beam edge operating at about half the efficiency of users near the center of the beam.

Figure 12:
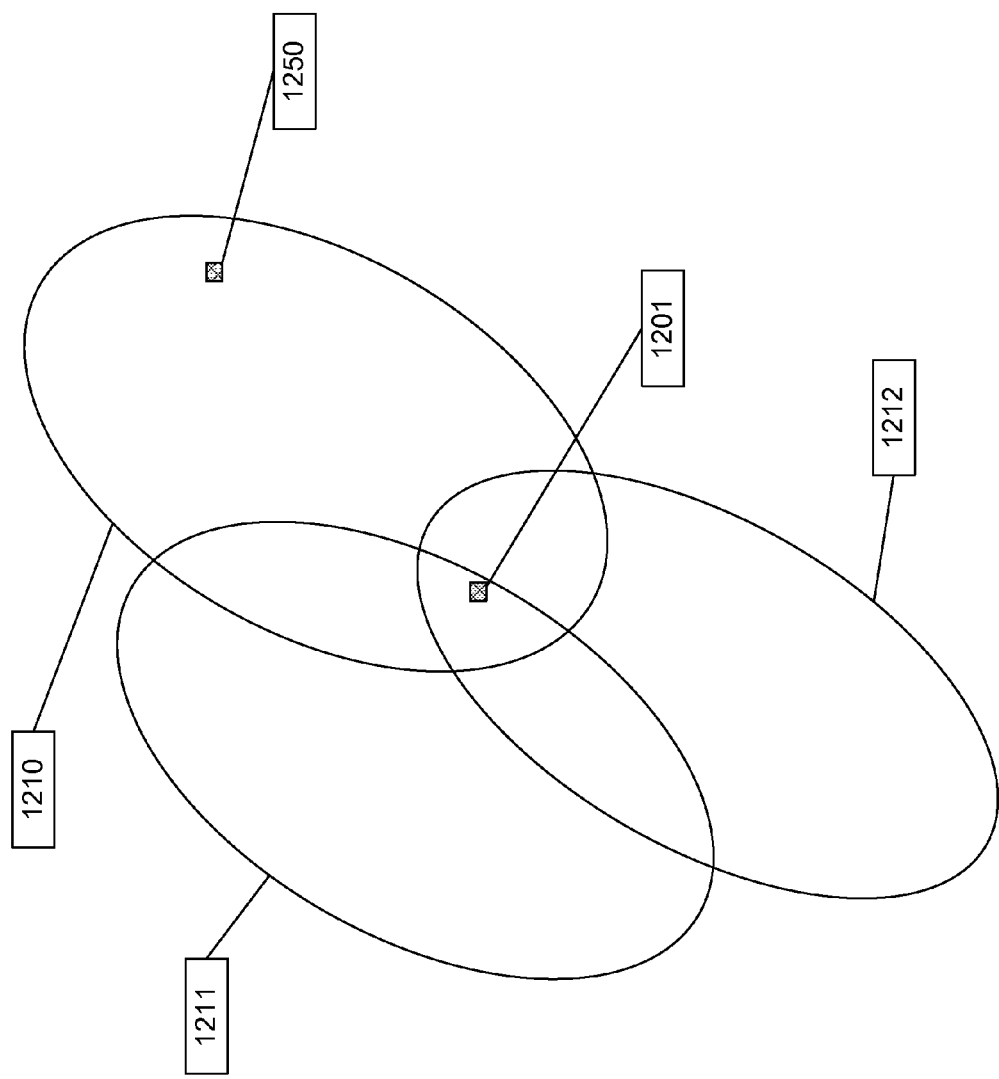
FIG. 12 depicts an example plot of an edge of beams area situation.

Using the various embodiments of the technology disclosed herein, it is possible to increase the aggregate capacity of the satellite communications system over time, and thereby increase the overall efficiency of the system to use a beam in satellite selection. In a single satellite system, however, this increase may be capped due to the limitations of having only one pattern of user spot beams from which to choose. A user terminal's location may not be within an efficient distance from the center of a user spot beam. FIG. 12 illustrates an example of this "edge of beams" situation. Assume in this example that region of interest 1201 (such as a metropolitan area like Chicago or New York City) can be serviced by three different user spot beams 1210, 1211, 1212 of a first satellite. Although user terminal 1201 could be serviced by any of the three user spot beams 1210, 1211, 1212, the region of interest 1201 is near the edge of all three beams, and hence terminals located within the region of interest 1201 will operate at lower, less efficient combinations of modulation and coding. This, in turn, results in a lower overall capacity of the satellite system because more resources must be expended to bring the performance of user terminals within the region of interest 1201 to an acceptable level (e.g., to an acceptable quality of service). However, 1201 is closer to the center of beam 1211 than to the centers of 1212 or 1213, so assigning users in region 1201 to 1211 will be slightly more efficient than assigning them to either of the other two beams.

The increase in market demand for broadband satellite communications presents a commercially viable opportunity to address the limitations associated with a single satellite system. The increase in demand has resulted in the proliferation of satellites covering the same or similar geographic areas. Therefore, terminals are not constrained to selecting beams from a single satellite. Various embodiments of the technology disclosed herein apply to the design and operation of a multi-satellite communications network to optimize the aggregate capacity over the network.

Figure 13:
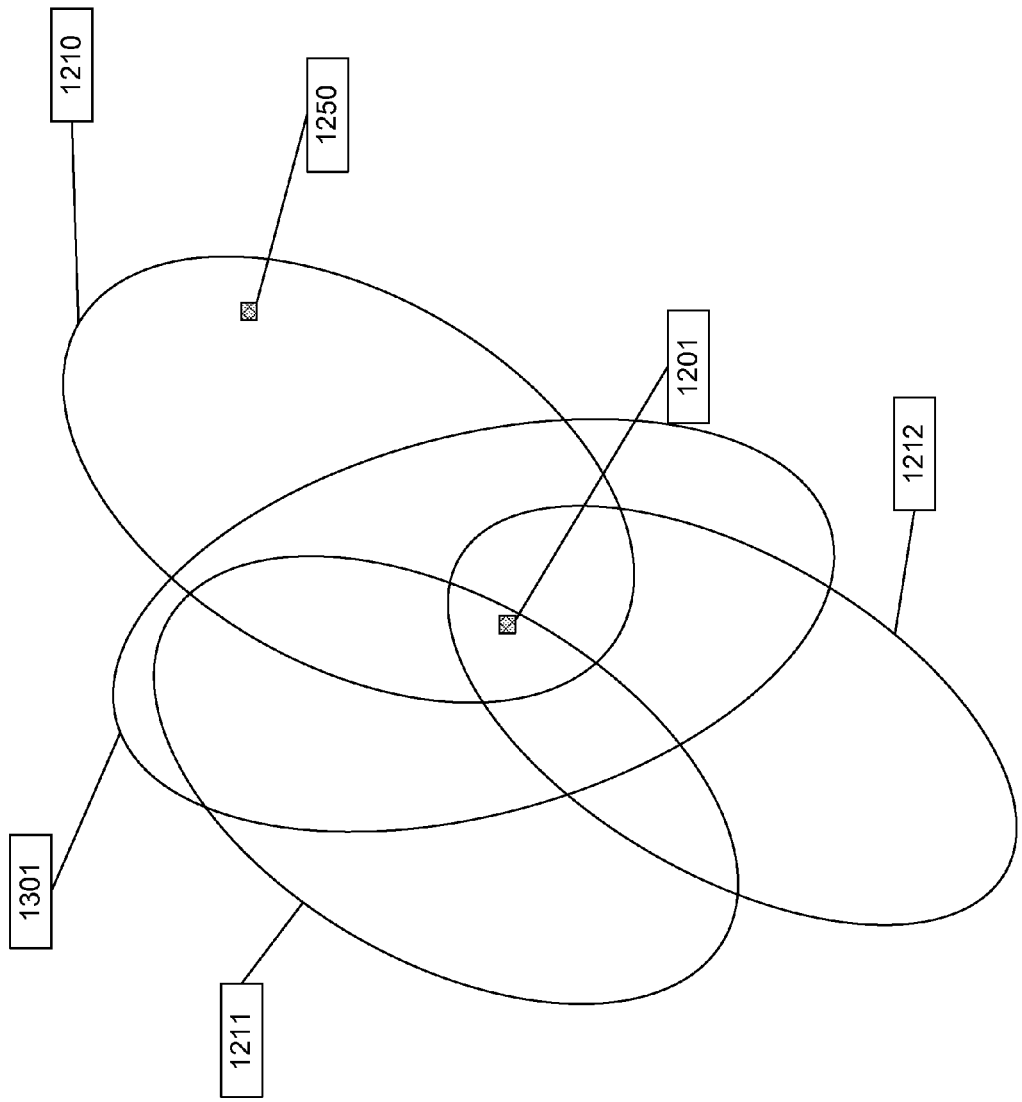
FIG. 13 depicts an example plot of a user spot beam of a second satellite covering a region of interest.

FIG. 13 is a diagram illustrating an example of the beam pattern of FIG. 12 augmented with an additional beam from a second satellite. Particularly in this example, a user spot beam 1301 from a second satellite also covers the region of interest 1201. As can be seen in this example, the region of interest 1201 is closer to the center of user spot beam 1301 than it is to the centers of any of the other available user spot beams 1210, 1211, 1212. Of the user spot beams that could service region of interest 1201, user spot beam 1301 would provide user terminals within region of interest 1201 with the largest S/(N+I) due the location near the center of user spot beam 1301 (assuming all other factors being relatively equal), allowing for a higher efficiency combination of modulation and coding to be applied. Accordingly, beam 1301 for the second satellite would be the "best" beam and the second satellite would be the "best" satellite. By assigning new user terminals in region of interest 1201 to the second satellite, and specifically to user spot beam 1301, the capacity of the second satellite will be high because of the high-efficiency performance of user terminals in region of interest 1201 assigned to user spot beam 1301 allowing the terminals to take advantage of the benefits of center of beam conditions. Likewise, if users in region of interest 1201 can be shifted away from the first satellite into the second satellite, the overall system efficiency can be increased for the same reasons. This can allow users to take advantage of the high-efficiency near the center of beam 301, and avoid requiring user spot beams 1210, 1211, 1212 to use resources on low-efficiency links.

Additionally, assigning user terminals in region of interest 1201 to user spot beam 1301, and accordingly to the second satellite, would improve the performance and aggregate capacity of the entire system. Such an assignment relieves user spot beams 1210, 1211, 1212 on the first satellite of needing to accommodate a low-efficiency link that would require more resources to ensure a quality link. Accordingly, the first satellite now has more available resources to take on assignments of other user terminals elsewhere within its beam pattern. Overall capacity on the system will thus increase because assignments to both satellites would result in more high-efficiency links on each satellite, increasing the capacity per user spot beam, which in turn increases the overall capacity of the satellite. In the aggregate, the system would be able to provide high-efficiency links to more terminals, allowing a greater number of terminals to connect to the network.

Further, the user terminal beam assignments need not be static, but may, in various embodiments, change over time as users unsubscribe from service and new users subscribe. As a user unsubscribes from service from user spot beams 1210, 1211, 1212, the overall capacity of each beam will increase because the beam will now be able to accept other assignments from new terminals located closer to beam center. As such, the overall capacity of the system will increase over time by assigning new users within the region of interest 1201 to the second satellite. Additionally, other circumstances may arise that enable reassignment of user terminals to particular beams as new beams are added to the system. For example, user terminals can be reflashed or otherwise updated to select a new spot beam upon system reconfiguration. In other embodiments, user terminals can be configured to redo their beam assignment determinations periodically in the event that new beams were added or other circumstances have changed to warrant an update to the assignment.

Figure 14:
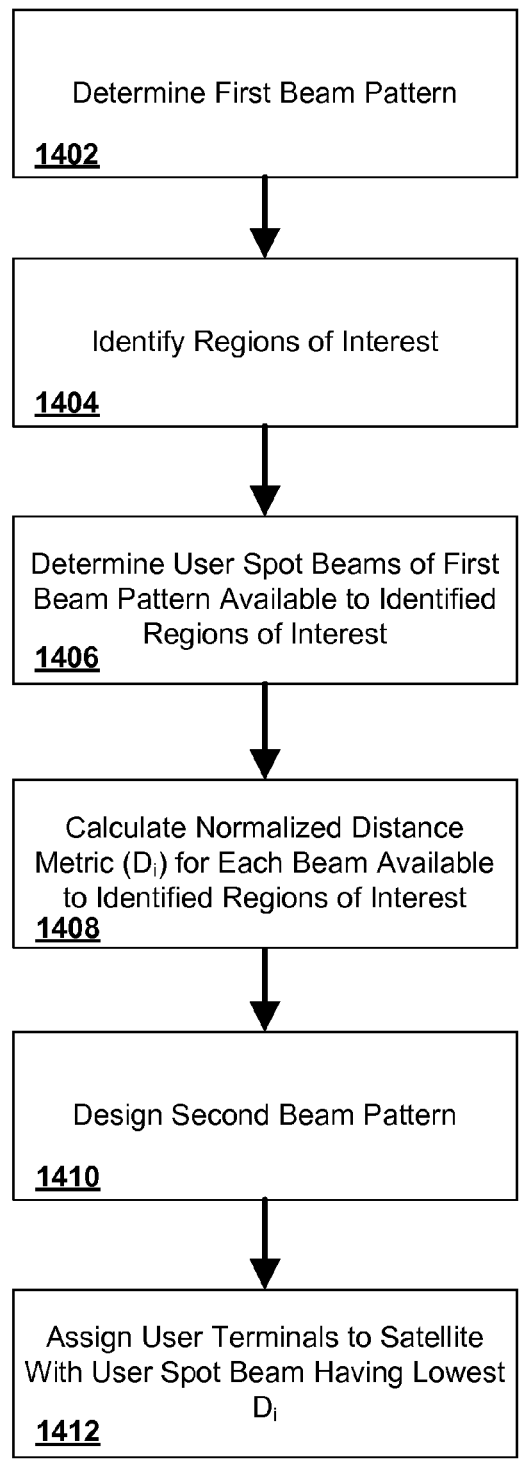
FIG. 14 depicts an example method of designing satellites to increase capacity over the entire system.

In further embodiments, the satellite system can be designed or updated with these beam pattern parameters in mind to optimize or otherwise reach an improved distribution of users in the user spot beams. FIG. 14 is a diagram illustrating an example process for designing or implementing satellite beam patterns to optimize or reach improved capacity over the entire system using embodiments of the technology herein discussed. At step 1402, a first beam pattern covering a geographic coverage area is determined. In one embodiment, this first beam pattern corresponds to user spot beams of a satellite that is already deployed and operational, i.e. has user terminals assigned to its user spot beams comprising the first beam pattern. In this embodiment, determining the first beam pattern involves identifying the current location of the user spot beams of the first satellite.

In another embodiment, step 1402 comprises determining the first beam pattern of a first satellite that is not yet deployed. In this embodiment, the first beam pattern is not currently used by any user terminals on the network. Accordingly, the system administrator has greater flexibility to plot the first beam pattern based on user locations (existing and predicted future users) and the overall capacity of a broadband multi-satellite system.

At step 1404, a number of regions of interest are identified. Regions of interest may, in some embodiments, comprise regions having a relatively high-density concentration of users such as, for example, a metropolitan region or other population center. There are a number of different metrics that a system administrator may employ in identifying specific regions of interest wherein positioning a spot beam with a beam center at or close to the region of interest would result in a greater aggregate capacity of the system or otherwise improved system performance. Some regions that may be classified as regions of interest can include, but are not limited to: high traffic regions; regions with large population densities; strategic regions for network expansion; and so on. Other metrics that can be considered include load balancing among a plurality of satellites. System designers could identify regions of interest using a single metric, or any combination of metrics, to obtain a desired number and type of regions of interest. In further embodiments, the identification of regions of interest can be automated using data from databases containing information about users and user locations, traffic volumes, population information (residential and commercial), and so on. With this information, the system can automatically identify regions of interest using, for example, the metrics described above.

At step 1406, the system determines which user spot beams of the first beam pattern are available to service the identified regions of interest. This can be achieved, for example, by comparing location information (e.g., latitude and longitude coordinates) for the regions of interest with the beam pattern information to determine whether there is overlap. The system can be configured to identify which spot beam or which plurality of spot beams of the first beam pattern are available for each identified region of interest.

At step 1408, the system determines the "best" spot beam for each region of interest. That is, in some embodiments as described above, normalized distance metrics for each user spot beam available to a particular region of interest are calculated. These normalized distance metrics can be used to determine the beam for which the region of interest is closest to the center. As also noted above, this decision can be weighted where appropriate. Although, in the case of the determination for a single satellite (e.g., the first satellite of a plurality of satellites), the weighting factor may not apply. Accordingly, by calculating the normalized distance metrics for a given region of interest, the system can determine which user spot beam of the first beam pattern qualifies as the "best" beam for terminals within the region of interest. This process of identifying the "best" spot beam can be repeated for each of the remaining regions of interest. In addition to regions of interest, best beam determinations can be made for remaining users or secondary regions of interest in the network. Accordingly, the system can be configured to determine best-beam assignments for each user terminal (whether or not within a region of interest) for the satellite network. From this determination, loading and other capacity estimations can be made to evaluate the efficiency of the network and the availability of resources based on this single-satellite determination.

In embodiments where the first satellite is an existing satellite already serving a population of user terminals, the regions of interest, best-beam determinations, and beam assignments may already have been made for a given user population. Alternatively, in embodiments where the first satellite is an existing satellite already serving a population of user terminals, prior assignments may be made without best-beam considerations. Accordingly, the best-beam determinations can be made for the existing satellite to determine if a reassignment of beams would benefit system performance. Although it is noted that in some applications beam reassignment may not be possible or practical with previously deployed user terminals.

At step 1410, a second beam pattern for a second satellite is designed. Preferably, the beam pattern design is made with the goal of optimizing system efficiency and capacity. Therefore, in some embodiments, the second beam pattern is laid out such that the identified regions of interest fall within or near the center of at least one user spot beam of the second beam pattern. In further embodiments, the system can be configured to determine which regions of interest are not adequately served by the first beam pattern, and to map out the second beam pattern based on the locations of those identified, underserved regions of interest. For example, the system can be configured with a specified minimum normalized distance metric as a design goal. This minimum normalized distance metric can be specified, for example, based on desired system specification goals such as SNR or modcods efficiency requirements. In such a configuration, regions of interest having a normalized distance metric greater than this specified minimum can be considered when mapping the second beam pattern, and the system can be configured with the goal of mapping the second beam pattern such that these underserved regions of interest are within the minimum normalized distance metric for at least one spot beam of the second beam pattern.

In yet another embodiment, the second beam pattern can be designed with the goal of simply improving the performance for one or more identified regions of interest. In such embodiments, designing the second beam pattern can comprise plotting the user spot beams of a second beam pattern such that at least one of the user spot beams has a normalized distance metric relative to an identified region of interest lower than the normalized distance metrics of the "best" user spot beam of the first beam pattern identified for that region of interest. This may be accomplished by positioning the center of at least one user spot beam of the second beam pattern closer to an identified region of interest then the "best" user spot beam of the first beam pattern already identified for that region of interest.

In implementations where existing beam assignments of user terminals for the first satellite are not re-assignable, system parameters may be configured such that a spot beam from the second beam pattern is located to serve the region of interest to accommodate growth of users in that region. Accordingly, a region of interest may be at or near the center of a user spot beam for each of the first and second beam patterns to provide capacity for growth of user terminals with the potential of a high-efficiency link in the region of interest.

At step 1412, the system assigns user terminals within the region of interest to the second satellite. In embodiments where the second beam pattern of the second satellite has a lower normalized distance metric, the second satellite qualifies as the "best" satellite, and the user spot beam of the second beam pattern the "best" beam. By assigning user terminals to this user spot beam of the second satellite, the system can achieve the greater aggregate capacity as discussed above than it would otherwise achieved by continuing to assign users to the original spot beam from the first satellite.

Simulated results show the increase in efficiency capable by implementing various embodiments of the technology herein disclosed. As a baseline for the simulation, all users were assigned to one of two satellites with overlapping coverage areas utilizing the traditional methods. The average number of dBs down from center from the baseline simulation was 2.6 dBs. When the user terminals were reassigned based on the calculation of normalized distance in accordance with the technology disclosed herein, the average number of dBs down from center decreased to 1.7 dBs. This improvement of nearly 1 dB corresponds to approximately a 10% increase in efficiency. By using the technology herein disclosed, an increase of 10% in overall capacity of the two satellites is achievable over the traditional method of assignment.

Figure 15:
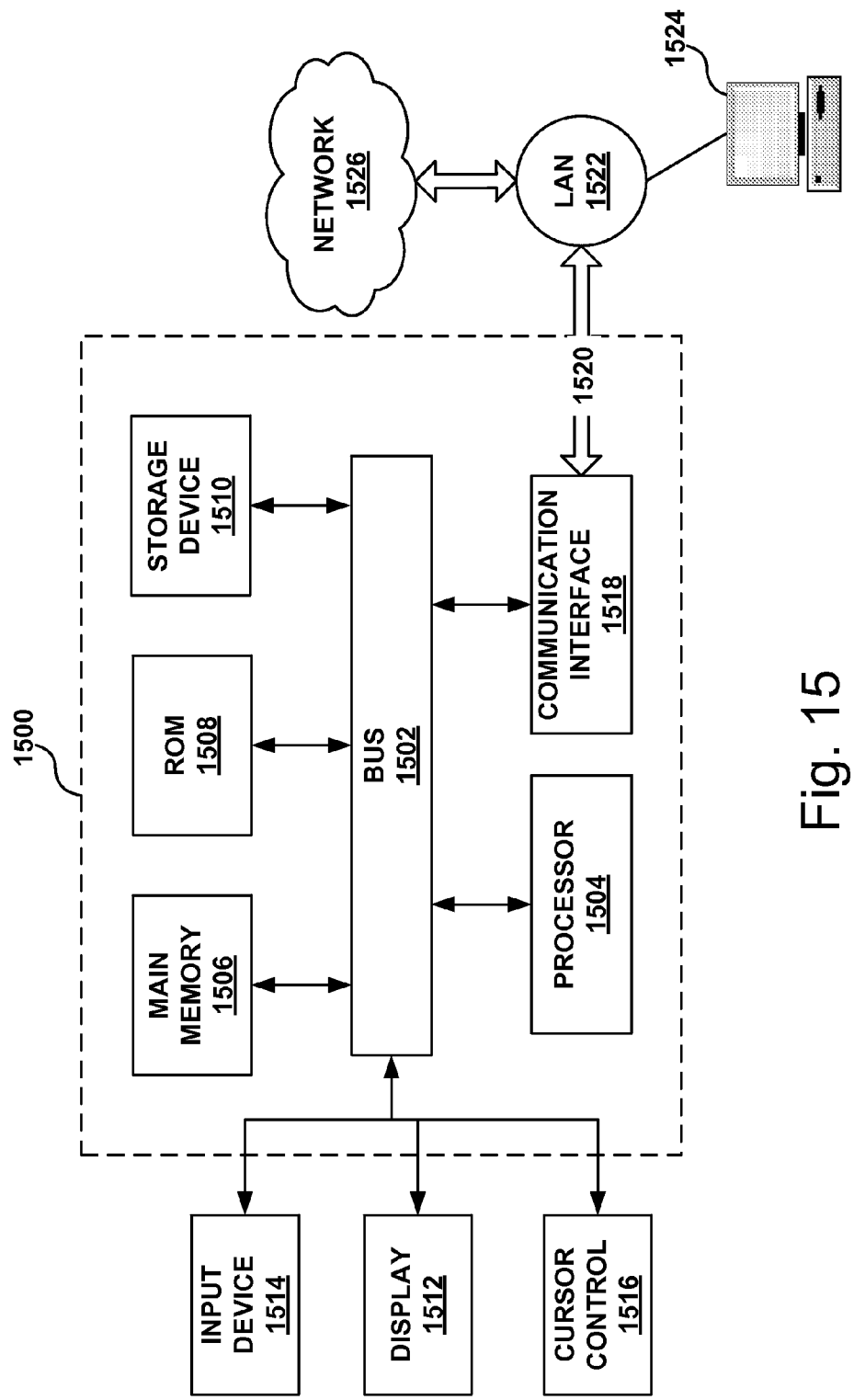
FIG. 15 is an example computing module that may be used in implementing various features of embodiments of the disclosed technology.

FIG. 15 illustrates a computer system 1500 upon which example embodiments according to the technology disclosed herein can be implemented. Computer system 1500 can include a bus 1502 or other communication mechanism for communicating information, and a processor 1504 coupled to bus 1502 for processing information. Computer system 1500 may also include main memory 1506, such as a random access memory (RAM) or other dynamic storage device, coupled to bus 1502 for storing information and instructions to be executed by processor 1504. Main memory 1506 can also be used for storing temporary variables or other intermediate information during execution of instructions to be executed by processor 1504. Computer system 1500 may further include a read only memory (ROM) 1508 or other static storage device coupled to bus 1502 for storing static information and instructions for processor 1504. A storage device 1510, such as a magnetic disk or optical disk, may additionally be coupled to bus 1502 for storing information and instructions.

Computer system 1500 can be coupled via bus 1502 to a display 1512, such as a cathode ray tube (CRT), liquid crystal display (LCD), active matrix display, light emitting diode (LED)/organic LED (OLED) display, digital light processing (DLP) display, or plasma display, for displaying information to a computer user. An input device 1514, such as a keyboard including alphanumeric and other keys, may be coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512.

According to one embodiment of the technology disclosed herein, dynamic bandwidth management, in accordance with example embodiments, are provided by computer system 1500 in response to processor 1504 executing an arrangement of instructions contained in main memory 1506. Such instructions can be read into main memory 1506 from another computer-readable medium, such as storage device 1510. Execution of the arrangement of instructions contained in main memory 1506 causes processor 1504 to perform one or more processes described herein. One or more processors in a multi-processing arrangement may also be employed to execute the instructions contained in main memory 1506. In alternative embodiments, hard-wired circuitry is used in place of or in combination with software instructions to implement various embodiments. Thus, embodiments described in the present disclosure are not limited to any specific combination of hardware circuitry and software.

Computer system 1500 may also include a communication interface 1518 coupled to bus 1502. Communication interface 1518 can provide a two-way data communication coupling to a network link 1520 connected to a local network 1522. By way of example, communication interface 1518 may be a digital subscriber line (DSL) card or modem, an integrated services digital network (ISDN) card, a cable modem, or a telephone modem to provide a data communication connection to a corresponding type of telephone line. As another example, communication interface 1518 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1518 sends and receives electrical, electromagnetic, or optical signals that carry digital data streams representing various types of information. Further, communication interface 1518 may include peripheral interface devices, such as a Universal Serial Bus (USB) interface, a PCMCIA (Personal Computer Memory Card International Association) interface, etc.

Network link 1520 typically provides data communication through one or more networks to other data devices. By way of example, network link 1520 can provide a connection through local network 1522 to a host computer 1524, which has connectivity to a network 1526 (e.g. a wide area network (WAN) or the global packet data communication network now commonly referred to as the "Internet") or to data equipment operated by service provider. Local network 1522 and network 1526 may both use electrical, electromagnetic, or optical signals to convey information and instructions. The signals through the various networks and the signals on network link 1520 and through communication interface 1518, which communicate digital data with computer system 1500, are example forms of carrier waves bearing the information and instructions.

Computer system 1500 may send messages and receive data, including program code, through the network(s), network link 1520, and communication interface 1518. In the Internet example, a server (not shown) might transmit requested code belonging to an application program for implementing an embodiment of the technology through network 1526, local network 1522 and communication interface 1518. Processor 1504 executes the transmitted code while being received and/or store the code in storage device 1510, or other non-volatile storage for later execution. In this manner, computer system 1500 obtains application code in the form of a carrier wave.

The term "computer-readable medium" as used herein refers to any medium that participates in providing instructions to processor 1504 for execution. Such a medium may take many forms, including but not limited to non-volatile media, volatile media, and transmission media. Non-volatile media include, for example, optical or magnetic disks, such as storage device 1510. Volatile media may include dynamic memory, such as main memory 1506. Transmission media may include coaxial cables, copper wire and fiber optics, including the wires that comprise bus 1502. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the technology may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 16 illustrates a chip set 1600 in which embodiments of the technology may be implemented. Chip set 1600 can include, for instance, processor and memory components described with respect to FIG. 16 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1600 includes a communication mechanism such as a bus 1602 for passing information among the components of the chip set 1600. A processor 1604 has connectivity to bus 1602 to execute instructions and process information stored in a memory 1606. Processor 1604 includes one or more processing cores with each core configured to perform independently. A multi-core processor enables multiprocessing within a single physical package. Examples of a multi-core processor include two, four, eight, or greater numbers of processing cores. Alternatively or in addition, processor 1604 includes one or more microprocessors configured in tandem via bus 1602 to enable independent execution of instructions, pipelining, and multithreading. Processor 1604 may also be accompanied with one or more specialized components to perform certain processing functions and tasks such as one or more digital signal processors (DSP) 1608, and/or one or more application-specific integrated circuits (ASIC) 1610. DSP 1608 can typically be configured to process real-world signals (e.g., sound) in real time independently of processor 1604. Similarly, ASIC 1610 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1604 and accompanying components have connectivity to the memory 1606 via bus 1602. Memory 1606 includes both dynamic memory (e.g., RAM) and static memory (e.g., ROM) for storing executable instructions that, when executed by processor 1604, DSP 1608, and/or ASIC 1610, perform the process of example embodiments as described herein. Memory 1606 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 15. Various embodiments are described in terms of this example-computing module 1500. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

It is to be understood that the figures and descriptions of the technology disclosed herein have been simplified to illustrate elements that are relevant for a clear understanding of the technology, while eliminating, for purposes of clarity, other elements. Those of ordinary skill in the art will recognize, however, that these and other elements may be desirable. However, because such elements are well known in the art, and because they do not facilitate a better understanding of the technology, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the technology a single component may be replaced by multiple components, and multiple components may be replaced by a single component, to provide an element or structure or to perform a given function or functions. Except where such substitution would not be operative to practice certain embodiments of the technology, such substitution is considered within the scope of the technology.

The examples presented herein are intended to illustrate potential and specific implementations of the technology disclosed herein. It can be appreciated that the examples are intended primarily for purposes of illustration of the technology for those skilled in the art. The diagrams depicted herein are provided by way of example. There may be variations to these diagrams or the operations described herein without departing from the spirit of the technology. For instance, in certain cases, method steps or operations may be performed or executed in differing order, or operations may be added, deleted or modified.

Furthermore, whereas particular embodiments of the technology have been described herein for the purpose of illustrating the technology and not for the purpose of limiting the same, it will be appreciated by those of ordinary skill in the art that numerous variations of the details, materials and arrangement of elements, steps, structures, and/or parts may be made within the principle and scope of the technology disclosed herein without departing from the technology as described in the following claims.

What is claimed is:

1. An apparatus for satellite selection within a multi-satellite communication system, comprising:
   a receiver;
   a transmitter;
   an antenna coupled to the receiver and the transmitter and configured to send and receive RF signals; and
   a processing module configured to execute instructions stored on a non-transitory storage medium, the instructions causing the processing module to perform the operations, comprising:
      determine a plurality of user spot beams available to the apparatus from at least a first satellite and a second satellite of the multi-satellite communication system;
      calculate a normalized distance metric for the plurality of user spot beams;
      select the user spot beam with the lowest normalized distance metric; and
      determine which of the at least first or second satellite is transmitting the selected user spot beam, and select an outroute on the selected user spot beam using the antenna.

2. The apparatus of claim 1, further comprising a polarizer, wherein the processing module is further configured to select the user spot beam with the lowest normalized distance metric and with a polarization that is the same as a polarization of the polarizer.

3. The apparatus of claim 2, wherein the polarizer is switchable and the processing module is further configured to switch the polarizer to match the polarization of the selected user spot beam.

4. The apparatus of claim 1, wherein the normalized distance metric is calculated according to the equation:

$$D_i = \left( \frac{\sqrt{(x-x_i)^2 + (y-y_i)^2}}{R_i} \right)^{w_i}$$

where $D_i$ is the normalized distance metric, (x, y) is location of the apparatus in horizontal one of (azimuth (az)/elevation (el)) and U/V coordinates, $(x_i, y_i)$ is the location of the center of the user spot beam in one of az/el or U/V coordinates, $R_i$ is the radius of the user spot beam, and $W_i$ is the weight given to the user spot beam.

5. The apparatus of claim 4, wherein the radius $R_i$ is calculated according to the equation:

$$R_i = \sqrt{\left( \begin{array}{c} (R_{1i}*\cos(\theta_i - a_i)*\cos(a_i) - R_{2i}*\sin(\theta_i - a_i)*\sin(a_i)^2 + \\ (R_{2i}*\sin(\theta_i - a_i)*\cos(a_i) + R_{1i}*\cos(\theta_i - a_i)*\cos(a_i)) \end{array} \right)^2}$$

where $R_{1i}$ is the semi-major axis of the user spot beam, $R_{2i}$ is the semi-minor axis of the user spot beam, $a_i$ is the tilt angle of the user spot beam, and is calculated according to the equation:

$\theta_i = \arctan((y-y_{01})/(x-x_{01}))$ where $(x_{01}, y_{01})$ is the location of the centroid of the user spot beam.

6. The apparatus of claim 4, wherein the radius $R_i$ is calculated according to the equation:

$R_i = F_i(x_{01}, y_{01})$ where $F_i$ is a function particular to the user spot beam and known to the apparatus.

7. The apparatus of claim 4, wherein the weight is determined based on at least one of: loading attributes of a given satellite; relative loading of multiple satellites; quality of service available for a given user spot beam; quality of service available for a given satellite; availability of security mechanisms; reliability of the connection.

8. The apparatus of claim 4, wherein the weight is applied only if the difference between the normalized distance metrics of two user spot beams is less than a threshold amount.

9. The apparatus of claim 1, wherein the antenna is repositionable and the processing module is further configured to reposition the antenna to communicate over the satellite of the at least two satellites transmitting the selected user spot beam.

10. The apparatus of claim 1, wherein the antenna is repositionable and the processing module is further configured to alert that the antenna must be repositioned to allow communication over the satellite of the at least two satellites transmitting the selected user spot beam.

11. The apparatus of claim 1, wherein the non-transitory storage medium further comprises locations of centers, radii, and beam shapes of a plurality of user spot beams for a plurality of satellites.

12. The apparatus of claim 11, wherein the apparatus is a mobile terminal and the instructions comprise:
determine a plurality of user spot beams available to the apparatus during a predetermined route based on the locations of centers, radii, and beam shapes information stored in the non-transitory computer-readable medium;
calculate a normalized distance metric for the plurality of user spot beams available during the route;
identify each user spot beam with the lowest normalized distance metric for a plurality of points along the route;
determine which satellite of the plurality of satellites is transmitting the selected user spot beam; and
store in a beam table the identified user spot beam for the plurality of points and the satellite transmitting the selected user spot beam in the non-transitory storage medium.

13. The apparatus of claim 12, wherein the processing module is further configured to execute the instruction to select the user spot beam with the lowest normalized distance metric by querying the stored beam table and selecting the user spot beam previously identified for that point of the route.

14. The apparatus of claim 1, wherein the antenna is a scanning antenna and is configured to periodically scan an area to detect user spot beams available to service the apparatus.

15. The apparatus of claim 1, wherein the processing module is further configured to determine the current location of the apparatus based on at least one of the following: a position determination system; deduced reckoning; manual position entry; transmitted position information from an external device.

16. The apparatus of claim 1, wherein the processing module is further configured to execute the instructions on a periodic basis.

17. The apparatus of claim 1, wherein the processing module is further configured to execute the instructions when at least one of the following occurs: quality of service falls below a threshold value; changes in beam patterns; changes in beam shapes; changes in weighting factors; detection of new user spot beams; detection of new satellite.

18. A method for satellite selection in a multi-satellite communication system, comprising:
identifying a plurality of user spot beams available to a user terminal from at least a first satellite and a second satellite of the multi-satellite communication system, wherein the user terminal comprises an antenna configured to send and receive RF signals;
calculating a normalized distance metric for the plurality of user spot beams; and
selecting the user spot beam with the lowest normalized distance metric;
determining which of the at least first or second satellite is transmitting the selected user spot beam, and negotiating an outroute on the selected user spot beam for the user terminal over the antenna.

19. The method of claim 18, wherein the user terminal further comprises a polarizer.

20. The method of claim 19, wherein the step of selecting the user spot beam further comprises selecting the user spot beam with the lowest normalized distance metric and the same polarization as the polarizer.

21. The method of claim 19, wherein the polarizer is switchable and the method further comprises switching the polarization of the polarizer to match the polarization of the selected user spot beam.

22. The method of claim 18, wherein the normalized distance metric is calculated according to the equation:

$$D_i = \left( \frac{\sqrt{(x-x_i)^2 + (y-y_i)^2}}{R_i} \right)^{w_i}$$

where $D_i$ is the normalized distance metric, (x, y) is location of the user terminal in horizontal one of (azimuth (az)/elevation (el)) and U/V coordinates, $(x_i, y_i)$ is the location of the center of the user spot beam in one of az/el or U/V coordinates, $R_i$ is the radius of the user spot beam, and $W_i$ is the weight given to the user spot beam.

23. The method of claim 22, wherein the radius $R_i$ is calculated according to the equation:

$$R_i = \sqrt{\left(\begin{array}{l}(R_{1i} * \cos(\theta_i - a_i) * \cos(a_i) - R_{2i} * \sin(\theta_i - a_i) * \sin(a_i)^2 + \\ (R_{2i} * \sin(\theta_i - a_i) * \cos(a_i) + R_{1i} * \cos(\theta_i - a_i) * \cos(a_i))\end{array}\right)^2}$$

where $R_{1i}$ is the semi-major axis of the user spot beam, $R_{2i}$ is the semi-minor axis of the user spot beam, $a_i$ is the tilt angle of the user spot beam, and is calculated according to the equation:

$\theta_i = \arctan((y - y_{01})/(x - x_{01}))$ where $(x_{01}, y_{01})$ is the location of the centroid of the user spot beam.

24. The method of claim 22, wherein the radius $R_i$ is calculated according to the equation:

$R_i = F_i(x_{01}, y_{01})$ where $F_i$ is a function particular to the user spot beam and known to the user terminal.

25. The method of claim 18, wherein the antenna is repositionable and the method further comprises positioning the antenna to communicate over the satellite of the satellite determined to be transmitting the selected user spot beam.

26. A method of designing beam patterns to increase aggregate capacity within a satellite communications system, comprising:
  determining a first beam pattern of a plurality of user spot beams of a first satellite serving a first geographic area;
  identifying a plurality of high traffic regions within the first geographic area covered by the first beam pattern;
  determining the user spot beams of the first beam pattern covering each of the plurality of high traffic regions;
  determining a normalized distance metric for each of the user spot beams of the first beam pattern covering each of the plurality of high traffic regions; and
  plotting a second beam pattern of a second satellite such that at least one of a plurality of user spot beams of the second beam pattern has a lower normalized distance metric for at least one of the plurality of high traffic regions relative to the normalized distance metrics of the user spot beams of the first beam pattern covering each of the plurality of high traffic region.

27. The method of claim 26, wherein the normalized distance metric is calculated according to the equation:

$$D_i = \left(\frac{\sqrt{(x - x_i)^2 + (y - y_i)^2}}{R_i}\right)^{w_i}$$

where $D_i$ is the normalized distance metric, (x, y) is location of the high traffic region covered by the user spot beam in horizontal one of (az/el) and U/V coordinates, $(x_i, y_i)$ is the location of the center of the user spot beam in one of az/el or U/V coordinates, $R_i$ is the radius of the user spot beam, and $W_i$ is the weight given to the user spot beam.

28. The method of claim 27, wherein the radius $R_i$ is calculated according to the equation:

$$R_i = \sqrt{\left(\begin{array}{l}(R_{1i} * \cos(\theta_i - a_i) * \cos(a_i) - R_{2i} * \sin(\theta_i - a_i) * \sin(a_i)^2 + \\ (R_{2i} * \sin(\theta_i - a_i) * \cos(a_i) + R_{1i} * \cos(\theta_i - a_i) * \cos(a_i))\end{array}\right)^2}$$

where $R_{1i}$ is the semi-major axis of the user spot beam, $R_{2i}$ is the semi-minor axis of the user spot beam, $a_i$ is the tilt angle of the user spot beam, and is calculated according to the equation:

$\theta_1 = \arctan((y - y_{01})/(x - x_{01}))$ where $(x_{01}, y_{01})$ is the location of the centroid of the user spot beam.

29. The method of claim 27, wherein the method is performed prior to deployment of either satellite.

30. The method of claim 26, wherein the first satellite is already deployed and the step of determining the first beam pattern comprises identifying the location of a plurality of user spot beams of the first satellite.

31. The method of claim 30, wherein the step of identifying a plurality of high traffic regions comprises identifying geographic regions where there is a high number of edge of beams situations, wherein an edge of beam situation is when the normalized distance metric of a user spot beam relative to a user terminal exceeds a threshold value.

32. The method of claim 30, wherein the high traffic regions comprise areas where there are a plurality of user terminals already connecting to the system over the first satellite.

33. The method of claim 26, wherein the high traffic regions comprise densely populated areas.

34. The method of claim 26, wherein the high traffic regions comprise areas underserved by satellite broadband systems.

* * * * *